US 10,075,395 B2

United States Patent
Liu et al.

(10) Patent No.: US 10,075,395 B2
(45) Date of Patent: Sep. 11, 2018

(54) COMMUNICATION METHOD, OPTICAL MODULE, AND NETWORK DEVICE

(71) Applicant: Huawei Technologies Co., Ltd., Shenzhen (CN)

(72) Inventors: Hongming Liu, Shenzhen (CN); Jianwu Hao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 72 days.

(21) Appl. No.: 15/232,480

(22) Filed: Aug. 9, 2016

(65) Prior Publication Data
US 2016/0352650 A1  Dec. 1, 2016

Related U.S. Application Data

(63) Continuation of application No. PCT/CN2015/073302, filed on Feb. 26, 2015.

(30) Foreign Application Priority Data

Feb. 28, 2014  (CN) .......................... 2014 1 0073893

(51) Int. Cl.
*H04L 12/28* (2006.01)
*H04L 12/947* (2013.01)
(Continued)

(52) U.S. Cl.
CPC .......... *H04L 49/25* (2013.01); *H04L 43/0811* (2013.01); *H04L 43/10* (2013.01);
(Continued)

(58) Field of Classification Search
CPC ..... H04L 43/06; H04L 43/0811; H04L 43/10; H04L 45/02; H04L 45/26; H04L 45/72;
(Continued)

(56) References Cited

U.S. PATENT DOCUMENTS

| 6,538,997 B1 | 3/2003 | Wang et al. |
| 8,269,604 B2 | 9/2012 | Barragan Trevino et al. |

(Continued)

FOREIGN PATENT DOCUMENTS

| CN | 1988433 A | 6/2007 |
| CN | 101317349 A | 12/2008 |

(Continued)

OTHER PUBLICATIONS

Mizrahi T. et al., "An Overview of Operations, Administration, and Maintenance (OAM) Tools", Internet-Draft, http://www.ietf.org/ieff/lid-abstracts.txt, XP15097280A, Feb. 2014, 49 pages.

(Continued)

*Primary Examiner* — Kan Yuen
(74) *Attorney, Agent, or Firm* — Slater Matsil, LLP

(57) ABSTRACT

A communication method and an optical module are disclosed. In various embodiments the method includes generating, by an optical module, a first packet according to a service packet that passes through the optical module, wherein a source address of the first packet is the same as a source address of the service packet, and wherein a destination address of the first packet is the same as a destination address of the service packet; sending, the first packet in a transmission direction of the service packet; and receiving, a second packet sent by the network device, wherein the second packet indicates that the first transmission path from the optical module to the network device exists, and wherein the second packet instructs the optical module to communicate with a network management system by using the network device and the first transmission path.

20 Claims, 7 Drawing Sheets

(51) Int. Cl.
*H04L 12/751* (2013.01)
*H04L 12/721* (2013.01)
*H04L 29/06* (2006.01)
*H04L 29/08* (2006.01)
*H04L 12/26* (2006.01)
*H04Q 11/00* (2006.01)

(52) U.S. Cl.
CPC .............. *H04L 45/02* (2013.01); *H04L 45/26* (2013.01); *H04L 45/72* (2013.01); *H04L 69/22* (2013.01); *H04L 69/324* (2013.01); *H04L 43/06* (2013.01); *H04Q 2011/0079* (2013.01)

(58) Field of Classification Search
CPC ....... H04L 49/25; H04L 69/22; H04L 69/324; H04Q 2011/0079
See application file for complete search history.

(56) References Cited

U.S. PATENT DOCUMENTS

| | | |
|---|---|---|
| 2003/0145105 A1 | 7/2003 | Desineni et al. |
| 2007/0147836 A1 | 6/2007 | Dong |
| 2008/0198767 A1 | 8/2008 | Lebrun et al. |
| 2013/0071127 A1 | 3/2013 | Ota et al. |
| 2013/0259471 A1 | 10/2013 | Wang |
| 2014/0233946 A1* | 8/2014 | Gerstel .................. H04L 45/125 398/45 |
| 2014/0258486 A1* | 9/2014 | Filsfils .................... H04L 45/22 709/223 |

FOREIGN PATENT DOCUMENTS

| | | |
|---|---|---|
| CN | 101521895 A | 9/2009 |
| CN | 101677280 A | 3/2010 |
| CN | 101888310 A | 11/2010 |
| CN | 102217378 A | 10/2011 |
| CN | 103840976 A | 6/2014 |
| EP | 2557731 A1 | 2/2013 |

OTHER PUBLICATIONS

Chengwei W. et al., "Research on Optical Link Supervision Technology in PON System", Telecommunications Science, Sep. 2008, 6 pages.

Bradner S. et al., "Benchmarking Methodology for Network Interconnect Devices", RFC 2544, Informational Memo, Mar. 1999, 31 pages.

Series Y: Global Information Infrastructure, Internet Protocol Aspects and Next-Generation Networks, Internet protocol aspects—Quality of service and network performance, "Ethernet service activation test methodology", ITU-T, Y.1564, Mar. 2011, 38 pages.

Series G: Transmission Systems and Media, Digital Systems and Networks, Packet over Transport aspects—Ethernet over Transport aspects, Series Y: Global Information Infrastructure, Internet Protocol Aspects and Next-Generation Networks, Internet protocol aspects—Operation, administration and maintenance, "OAM functions and mechanisms for Ethernet based networks", ITU-T, G.8013/Y.1731, Nov. 2013, 99 pages.

* cited by examiner

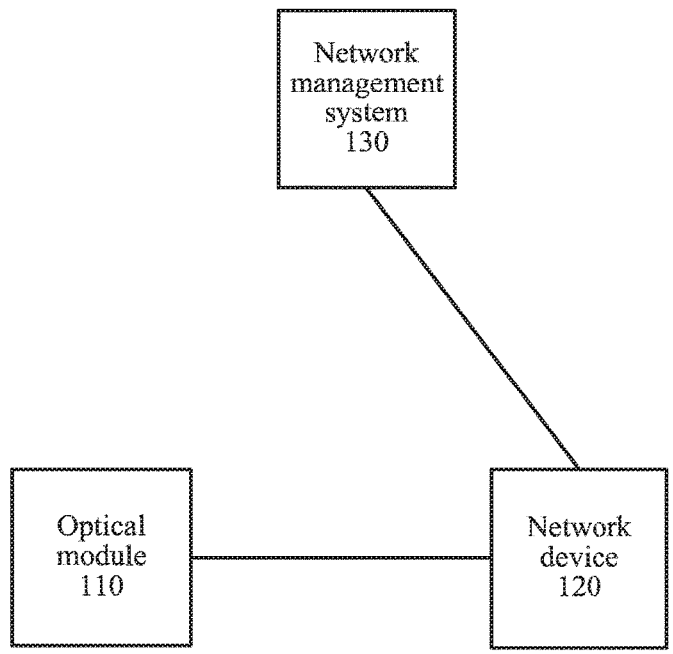

FIG. 1

An optical module generates a first packet according to a service packet that passes through the optical module, where a source address of the first packet is the same as a source address of the service packet, a destination address of the first packet is the same as a destination address of the service packet, the first packet further includes an identifier of the optical module and feature information, and the first packet is used to snoop whether a first transmission path exists from the optical module to a network device — 210

The optical module sends the first packet in a transmission direction of the service packet — 220

The optical module receives a second packet sent by the network device, where the second packet is used to respond to the first packet, and the second packet is used to indicate that the first transmission path from the optical module to the network device exists, where a communication path exists between the network device and a network management system, and the second packet includes the identifier of the optical module and the feature information — 230

FIG. 2

COMMUNICATION METHOD, OPTICAL MODULE, AND NETWORK DEVICE

CROSS-REFERENCE TO RELATED APPLICATIONS

This application is a continuation of International Application No. PCT/CN2015/073302, filed on Feb. 26, 2015, which claims priority to Chinese Patent Application No. 201410073893.2, filed on Feb. 28, 2014, both of which are hereby incorporated by reference in their entireties.

TECHNICAL FIELD

The present invention relates to the field of communications, and in particular, to a communication method, an optical module, and a network device.

BACKGROUND

With the development of Internet Protocol (IP) technologies and applications, a conventional telecommunications service undergoes a gradual shift to all-IP, and the IP technologies are further used as a service basis for a new telecommunications service. An IP network carries a telecommunications service, and naturally requirements in aspects such as reliability and manageability of a telecommunications service are introduced into the IP network. It is in this background that performance measurement and monitoring technologies of the IP network emerge and gradually become mandatory capabilities of the IP network.

A demand on a network device to support performance measurement and monitoring gradually becomes strong, and support statuses of devices of different vendors or devices of a same vendor within different periods are not the same. Therefore, difficulties are encountered during network deployment. Implementation of performance measurement and monitoring capabilities in an optical module (for example, an intelligent optical module) is a very desirable method for resolving the foregoing problem.

When being deployed in a network, an optical module may be plugged into a service port of a network device to complete a basic function of the optical module. The network device to which the optical module is inserted is a host device of the optical module. In this solution, the optical module is used as a logical module of the host device, and the optical module needs to rely on the host device to send data to a network management system. However, the host device deployed in the network generally does not provide a data reporting service. Therefore, in this solution, to implement that the optical module sends data to the network management system, the host device needs to be reconstructed.

SUMMARY

Embodiments provide a communication method, an optical module, and a network device so that the optical module may send data to a network management system without upgrading a host device of the optical module.

A first aspect provides a communication method, where the communication method includes: generating, by an optical module, a first packet according to a service packet that passes through the optical module, where a source address of the first packet is the same as a source address of the service packet, a destination address of the first packet is the same as a destination address of the service packet, the first packet further includes an identifier of the optical module and feature information, where the feature information is used to indicate that a packet including the feature information is an optical module management packet, and the first packet is used to snoop whether a first transmission path from the optical module to a network device exists; sending, by the optical module, the first packet in a transmission direction of the service packet; and receiving, by the optical module, a second packet sent by the network device, where the second packet is used to respond to the first packet, and the second packet is used to indicate that the first transmission path from the optical module to the network device exists, and instruct the optical module to communicate with a network management system by using the network device and the first transmission path, where a communication path exists between the network device and the network management system, the second packet includes the identifier of the optical module and the feature information, and a destination address of the second packet is the same as the source address of the first packet.

With reference to the first aspect, in a first possible implementation manner of the first aspect, the communication method further includes: generating, by the optical module, a third packet according to the second packet, where the third packet includes the identifier of the optical module and the feature information, and the third packet is used to notify the network device that a second transmission path from the network device to the optical module exists; and sending, by the optical module, the third packet through the first transmission path.

With reference to the first aspect or the first possible implementation manner of the first aspect, in a second possible implementation manner of the first aspect, a source address carried in the second packet is the destination address of the first packet; and after the receiving, by the optical module, a second packet sent by the network device, the communication method further includes: recording, by the optical module, information about the first transmission path in a path table of the optical module, where the information about the first transmission path includes the destination address of the first packet.

With reference to the first aspect or the first possible implementation manner of the first aspect, in a third possible implementation manner of the first aspect, a source address carried in the second packet is an address of the network device; and after the receiving, by the optical module, a second packet sent by the network device, the communication method further includes: recording, by the optical module, information about the first transmission path in a path table of the optical module, where the information about the first transmission path includes the address of the network device.

With reference to the second or the third possible implementation manner of the first aspect, in a fourth possible implementation manner of the first aspect, after the recording, by the optical module, information about the first transmission path in a path table of the optical module, the communication method further includes: sending, by the optical module, a maintenance message to the network device, where the maintenance message is used to determine whether the first transmission path is available; and if the optical module receives, within a preset period of time, a maintenance reply message sent by the network device, determining that the first transmission path is available, where the maintenance reply message is used to respond to the maintenance message; or if the optical module does not receive, within a preset period of time, a maintenance reply message sent by the network device, deleting the information about the first transmission path from the path table of the optical module.

With reference to any one of the second to the fourth possible implementation manners of the first aspect, in a fifth possible implementation manner of the first aspect, after the receiving, by the optical module, a second packet sent by the network device, the communication method further includes: generating and sending, by the optical module, a fourth packet according to the information about the first transmission path, where the fourth packet is used to report measurement data to the network management system, and the fourth packet includes the feature information.

With reference to the first aspect or any one of the first to the fifth possible implementation manners of the first aspect, in a sixth possible implementation manner of the first aspect, the first packet includes an Internet Protocol (IP) packet header, a protocol field in the IP packet header identifies that the IP packet header is used to encapsulate an Internet Control Message Protocol (ICMP) packet, a type field of the ICMP packet is set to an echo reply, and the ICMP packet includes the feature information.

With reference to the first aspect or any one of the first to the sixth possible implementation manners of the first aspect, in a seventh possible implementation manner of the first aspect, the first packet further includes a path identifier of the optical module, where the path identifier of the optical module is used to identify a path that is indicated by address information of the first packet, and the second packet further includes the path identifier of the optical module and a path identifier of the network device, where the path identifier of the network device is used to identify a path that is indicated by address information of the second packet.

With reference to the first aspect or any one of the first to the seventh possible implementation manners of the first aspect, in an eighth possible implementation manner of the first aspect, the generating, by an optical module, a first packet according to a service packet that passes through the optical module includes: randomly acquiring, by the optical module, the service packet from the service packet that passes through the optical module; and generating, by the optical module, the first packet according to the service packet.

With reference to the first aspect or the eighth possible implementation manner of the first aspect, in a ninth possible implementation manner of the first aspect, the randomly acquiring, by the optical module, the service packet from the service packet that passes through the optical module includes: when the optical module is located on a boundary of a distribution interval of multiple optical modules in a network, randomly acquiring, by the optical module, the service packet that goes in a direction of the distribution interval, where the sending, by the optical module, the first packet according to the address information includes: sending, by the optical module, the first packet according to the address information in the direction of the distribution interval.

A second aspect provides a communication method, where the communication method includes: receiving, by a network device, a first packet sent by an optical module, where a communication path exists between the network device and a network management system, the first packet is generated by the optical module according to a service packet that passes through the optical module, a source address of the first packet is the same as a source address of the service packet, a destination address of the first packet is the same as a destination address of the service packet, and the first packet includes an identifier of the optical module and feature information, where the feature information is used to indicate that a packet including the feature information is an optical module management packet, and the first packet is used to snoop whether a first transmission path from the optical module to the network device exists; generating, by the network device, a second packet according to the first packet, where a destination address of the second packet is the same as the source address of the first packet, the second packet is used to respond to the first packet, the second packet is used to indicate that the first transmission path from the optical module to the network device exists, and instruct the optical module to communicate with the network management system by using the network device and the first transmission path, and the second packet includes the identifier of the optical module and the feature information; and sending, by the network device, the second packet to the optical module.

With reference to the second aspect, in a first possible implementation manner of the second aspect, after the receiving, by a network device, a first packet sent by an optical module, the communication method further includes: sending, by the network device, a fifth packet to the network management system, where the fifth packet includes the identifier of the optical module and an identifier of the network device, and the fifth packet is used to notify the network management system of the identifier of the optical module and the identifier of the network device.

With reference to the second aspect or the first possible implementation manner of the second aspect, in a second possible implementation manner of the second aspect, the communication method further includes: receiving, by the network device, a third packet sent by the optical module, where the third packet includes the identifier of the optical module and the feature information, and the third packet is used to notify the network device that a second transmission path from the network device to the optical module exists.

With reference to the second possible implementation manner of the second aspect, in a third possible implementation manner of the second aspect, after the receiving, by the network device, a third packet sent by the optical module, the communication method further includes: sending, by the network device, a fifth packet to the network management system, where the fifth packet includes the identifier of the optical module and an identifier of the network device, and the fifth packet is used to notify the network management system of the identifier of the optical module and the identifier of the network device.

With reference to the second or the third possible implementation manner of the second aspect, in a fourth possible implementation manner of the second aspect, after the receiving, by the network device, a third packet sent by the optical module, the communication method further includes: recording, by the network device, information about the second transmission path in a path table of the network device, where the information about the second transmission path includes a mapping relationship among an egress interface, the destination address of the second packet, and the identifier of the optical module, and the egress interface is an interface for the network device to send the second packet.

With reference to the fourth possible implementation manner of the second aspect, in a fifth possible implementation manner of the second aspect, the communication method further includes: if the network device receives a maintenance message sent by the optical module, sending, by the network device, a maintenance reply message according to the maintenance message, where the maintenance message is used to determine whether the first transmission path between the optical module and the network device is available, and the maintenance reply message is used to respond to the maintenance message.

With reference to the fourth or the fifth possible implementation manner of the second aspect, in a sixth possible implementation manner of the second aspect, the communication method further includes: sending, by the network device, a sixth packet to the optical module through the egress interface, where the sixth packet is used to configure the optical module or request measurement data, and the sixth packet includes the feature information.

With reference to the second aspect or any one of the first to the sixth possible implementation manners of the second aspect, in a seventh possible implementation manner of the second aspect, the first packet includes an IP packet header, a protocol field in the IP packet header identifies that the IP packet header is used to encapsulate an ICMP packet, a type field of the ICMP packet is set to an echo reply, and the ICMP packet includes the feature information.

With reference to the second aspect or any one of the first to the seventh possible implementation manners of the second aspect, in an eighth possible implementation manner of the second aspect, the first packet further includes a path identifier of the optical module, where the path identifier of the optical module is used to identify a path that is indicated by address information of the first packet, and the second packet further includes the path identifier of the optical module and a path identifier of the network device, where the path identifier of the network device is used to identify a path that is indicated by address information of the second packet.

With reference to the second aspect or any one of the first to the seventh possible implementation manners of the second aspect, in a ninth possible implementation manner of the second aspect, a virtual private network (VPN) exists in the network, the generating, by the network device, a second packet according to the first packet includes: acquiring, by the network device, the address information from the first packet, where the address information includes a source address and a destination address, the source address is the source address of the service packet, and the destination address is the destination address of the service packet; when the first packet enters the network device, acquiring, by the network device, a VPN identifier of the first packet, where the network device receives, by using an ingress interface, the first packet sent by the optical module; and acquiring, by the network device from a routing table or a Media Access Control (MAC) table, address information of the second packet and information about the egress interface corresponding to the second packet according to the VPN identifier of the first packet and the address information of the first packet, where the network device sends the second packet to the optical module through the egress interface, the source address of the second packet is the destination address of the first packet, and the destination address of the second packet is the source address of the first packet, where the sending, by the network device, the second packet to the optical module includes: sending, by the network device, the second packet to the optical module through the egress interface.

A third aspect provides an optical module, where the optical module includes: a generation unit, configured to generate a first packet according to a service packet that passes through the optical module, where a source address of the first packet is the same as a source address of the service packet, a destination address of the first packet is the same as a destination address of the service packet, the first packet further includes an identifier of the optical module and feature information, where the feature information is used to indicate that a packet including the feature information is an optical module management packet, and the first packet is used to snoop whether a first transmission path from the optical module to a network device exists; a sending unit, configured to send the first packet in a transmission direction of the service packet; and a receiving unit, configured to receive a second packet sent by the network device, where the second packet is used to respond to the first packet, and the second packet is used to indicate that the first transmission path from the optical module to the network device exists, and instruct the optical module to communicate with a network management system by using the network device and the first transmission path, where a communication path exists between the network device and the network management system, the second packet includes the identifier of the optical module and the feature information, and a destination address of the second packet is the same as the source address of the first packet.

With reference to the third aspect, in a first possible implementation manner of the third aspect, the generation unit is further configured to generate a third packet according to the second packet, where the third packet includes the identifier of the optical module and the feature information, and the third packet is used to notify the network device that a second transmission path from the network device to the optical module exists; and the sending unit is further configured to send the third packet through the first transmission path.

With reference to the third aspect or the first possible implementation manner of the third aspect, in a second possible implementation manner of the third aspect, a source address carried in the second packet is the destination address of the first packet, and the optical module further includes: a recording unit, configured to: after the receiving unit receives the second packet sent by the network device, record, in a path table of the optical module, information about the first transmission path, where the information about the first transmission path includes the destination address of the first packet.

With reference to the third aspect or the first possible implementation manner of the third aspect, in a third possible implementation manner of the third aspect, a source address carried in the second packet is an address of the network device, and the optical module further includes: a recording unit, configured to: after the receiving unit receives the second packet sent by the network device, record, in a path table of the optical module, information about the first transmission path, where the information about the first transmission path includes the address of the network device.

With reference to the second or the third possible implementation manner of the third aspect, in a fourth possible implementation manner of the third aspect, the optical module further includes a determining unit and a deletion unit, the sending unit is further configured to: after the recording unit records, in the path table of the optical module, the information about the first transmission path, send a maintenance message to the network device, where the maintenance message is used to determine whether the first transmission path is available, the determining unit is configured to: if the receiving unit receives, within a preset period of time, a maintenance reply message sent by the network device, determine that the first transmission path is available, and the deletion unit is configured to: if the receiving unit does not receive, within a preset period of time, a maintenance reply message sent by the network device, delete the information about the first transmission path from the path table of the optical module, where the maintenance reply message is used to respond to the maintenance message.

With reference to the third aspect or any one of the first to the fourth possible implementation manners of the third aspect, in a fifth possible implementation manner of the third aspect, the sending unit further generates and sends a fourth packet according to the information about the first transmission path after the receiving unit receives the second packet sent by the network device, where the fourth packet is used to report measurement data to the network management system, and the fourth packet includes the feature information.

With reference to the third aspect or any one of the first to the fifth possible implementation manners of the third aspect, in a sixth possible implementation manner of the third aspect, the first packet includes an IP packet header, a protocol field in the IP packet header identifies that the IP packet header is used to encapsulate an ICMP packet, a type field of the ICMP packet is set to an echo reply, and the ICMP packet includes the feature information.

With reference to the third aspect or any one of the first to the sixth possible implementation manners of the third aspect, in an seventh possible implementation manner of the third aspect, the first packet further includes a path identifier of the optical module, where the path identifier of the optical module is used to identify a path that is indicated by address information of the first packet, and the second packet further includes the path identifier of the optical module and a path identifier of the network device, where the path identifier of the network device is used to identify a path that is indicated by address information of the second packet.

With reference to the third aspect or any one of the first to the seventh possible implementation manners of the third aspect, in an eighth possible implementation manner of the third aspect, the optical module is specifically configured to randomly acquire the service packet from the service packet that passes through the optical module; and generate the first packet according to the service packet.

With reference to the eighth possible implementation manner of the third aspect, in a ninth possible implementation manner of the third aspect, the optical module being configured to randomly acquire the service packet from the service packet that passes through the optical module includes: the optical module being specifically configured to: when the optical module is located on a boundary of a distribution interval of multiple optical modules in a network, randomly acquire the service packet that goes in a direction of the distribution interval, where the optical module being configured to send the first packet according to the address information includes: the optical module being specifically configured to send the first packet according to the address information in the direction of the distribution interval.

A fourth aspect provides a network device, where the network device includes: a receiving unit, configured to receive a first packet sent by an optical module, where a communication path exists between the network device and a network management system, the first packet is generated by the optical module according to a service packet that passes through the optical module, a source address of the first packet is the same as a source address of the service packet, a destination address of the first packet is the same as a destination address of the service packet, and the first packet includes an identifier of the optical module and feature information, where the feature information is used to indicate that a packet including the feature information is an optical module management packet, and the first packet is used to snoop whether a first transmission path from the optical module to the network device exists; a generation unit, configured to generate a second packet according to the first packet, where a destination address of the second packet is the same as the source address of the first packet, the second packet is used to respond to the first packet, the second packet is used to indicate that the first transmission path from the optical module to the network device exists, and instruct the optical module to communicate with the network management system by using the network device and the first transmission path, and the second packet includes the identifier of the optical module and the feature information; and a sending unit, configured to send the second packet to the optical module.

With reference to the fourth aspect, in a first possible implementation manner of the fourth aspect, the sending unit is further configured to: after the receiving unit receives the first packet sent by the optical module, send a fifth packet to the network management system, where the fifth packet includes the identifier of the optical module and an identifier of the network device, and the fifth packet is used to notify the network management system of the identifier of the optical module and the identifier of the network device.

With reference to the fourth aspect, in a second possible implementation manner of the fourth aspect, the receiving unit is further configured to receive a third packet sent by the optical module, where the third packet includes the identifier of the optical module and the feature information, and the third packet is used to notify the network device that a second transmission path from the network device to the optical module exists.

With reference to the second implementation manner of the fourth aspect, in a third possible implementation manner of the fourth aspect, the sending unit is further configured to: after the receiving unit receives the third packet sent by the optical module, send a fifth packet to the network management system, where the fifth packet includes the identifier of the optical module and an identifier of the network device, and the fifth packet is used to notify the network management system of the identifier of the optical module and the identifier of the network device.

With reference to the second or the third possible implementation manner of the fourth aspect, in a fourth possible implementation manner of the fourth aspect, the network device of the fourth aspect further includes: a recording unit, configured to: after the receiving unit receives the third packet sent by the optical module, record, in a path table of the network device, information about the second transmission path, where the information about the second transmission path includes a mapping relationship among an egress interface, the destination address of the second packet, and the identifier of the optical module, and the egress interface is an interface for the network device to send the second packet.

With reference to the fourth implementation manner of the fourth aspect, in a fifth possible implementation manner of the fourth aspect, the sending unit is further configured to: if the network device receives a maintenance message sent by the optical module, send, by the network device, a maintenance reply message according to the maintenance message, where the maintenance message is used to determine whether the first transmission path between the optical module and the network device is available, and the maintenance reply message is used to respond to the maintenance message.

With reference to the fourth or the fifth possible implementation manner of the fourth aspect, in a sixth possible implementation manner of the fourth aspect, the sending unit is further configured to send a sixth packet to the optical module through the egress interface, where the sixth packet is used to configure the optical module or request measurement data, and the sixth packet includes the feature information.

With reference to the fourth aspect or any one of the first to the sixth possible implementation manners of the fourth aspect, in a seventh possible implementation manner of the fourth aspect, the first packet includes an IP packet header, a protocol field in the IP packet header identifies that the IP packet header is used to encapsulate an ICMP packet, a type field of the ICMP packet is set to an echo reply, and the ICMP packet includes the feature information.

With reference to the fourth aspect or any one of the first to the seventh possible implementation manners of the fourth aspect, in an eighth possible implementation manner of the fourth aspect, the first packet further includes a path identifier of the optical module, where the path identifier of the optical module is used to identify a path that is indicated by address information of the first packet, and the second packet further includes the path identifier of the optical module and a path identifier of the network device, where the path identifier of the network device is used to identify a path that is indicated by address information of the second packet.

With reference to the fourth aspect or any one of the first to the seventh possible implementation manners of the fourth aspect, in a ninth possible implementation manner of the fourth aspect, a VPN exists in the network, the network device being configured to generate a second packet according to the first packet, includes: the network device being specifically configured to acquire the address information from the first packet, where the address information includes a source address and a destination address, the source address is the source address of the service packet, and the destination address is the destination address of the service packet; when the first packet enters the network device, acquire a VPN identifier of the first packet, where the network device receives, by using the ingress interface, the first packet sent by the optical module; and acquire, from a routing table or a MAC table, address information of the second packet and information about the egress interface corresponding to the second packet according to the VPN identifier of the first packet and the address information of the first packet, where the network device sends the second packet to the optical module through the egress interface, the source address of the second packet is the destination address of the first packet, and the destination address of the second packet is the source address of the first packet, where the network device being configured to send the second packet to the optical module includes: the network device being specifically configured to send the second packet to the optical module through the egress interface.

According to the technical solutions of the embodiments, a packet is generated according to a service packet that passes through an optical module, the packet is sent in a transmission direction of the service packet, and a transmission path between the optical module and a network device is determined according to a packet returned by the network device. Because there is a communication path between the network device and a network management system, the optical module may communicate with the network management system by using the network device without requiring a host device to provide a data reporting service to the optical module. Therefore, in a case in which the host device of the optical module is not reconstructed, the optical module can send data to the network management system, thereby reducing reconstruction costs of a network and impact on the original network.

BRIEF DESCRIPTION OF THE DRAWINGS

FIG. 1 is a schematic architectural diagram of a communications system according to an embodiment;

FIG. 2 is a schematic flowchart of a communication method according to an embodiment;

DETAILED DESCRIPTION OF ILLUSTRATIVE EMBODIMENTS

Figure 3:
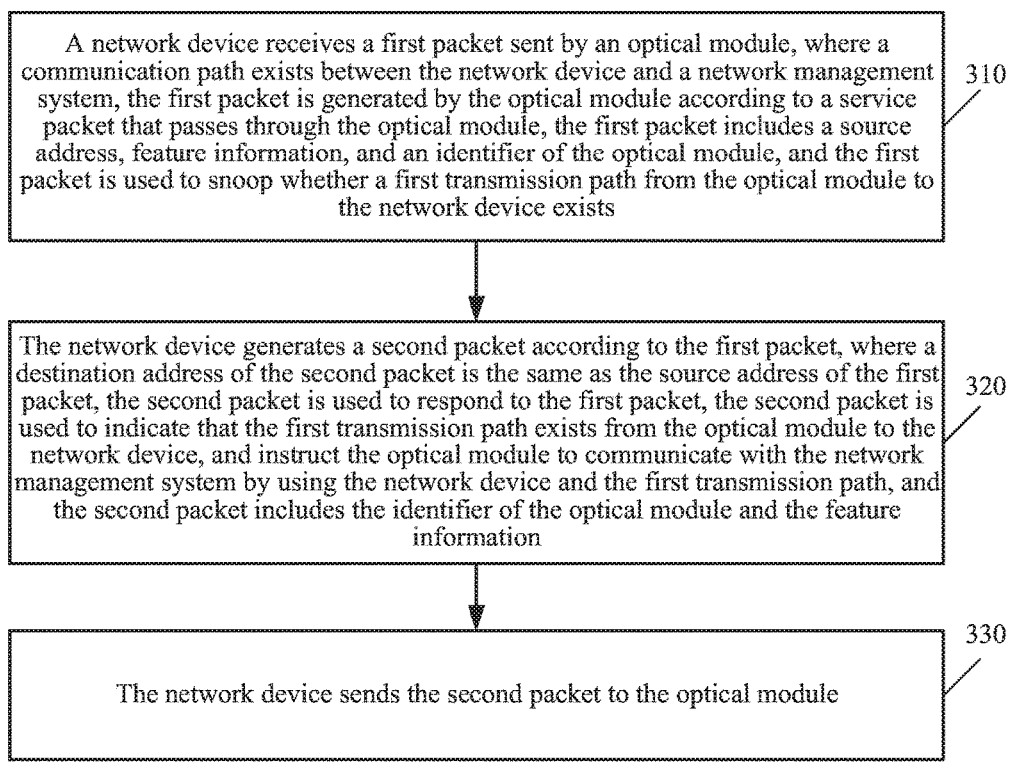
FIG. 3 is a schematic flowchart of a communication method according to another embodiment.

The following clearly describes the technical solutions in the embodiments with reference to the accompanying drawings in the embodiments. Apparently, the described embodiments are some but not all of the embodiments. All other embodiments obtained by a person of ordinary skill in the art based on the embodiments without creative efforts shall fall within the protection scope of this application.

FIG. 1 is a schematic architectural diagram of a communications system 100 according to an embodiment. The communications system 100 includes an optical module 110, a network device 120, and a network management system 130. The optical module no, for example, a small form-factor pluggable optical module, may be inserted to a host device (which is not shown in FIG. 1) of the optical module no. The network device 120 may be a network device such as a router, and the network device 120 has a forwarding function, and specifically may be a network device that has a Conversation Transfer Point (CTP) function, where the CTP may be a logical functional entity in the network device 120. The network management system 130 may be a system which plays a role of management and scheduling in a network, for example, a network management system server.

For convenience of description, FIG. 1 shows only one optical module and one network device. A person skilled in the art should understand that, the communications system may include multiple optical modules and multiple network devices.

FIG. 2 is a schematic flowchart of a communication method according to an embodiment. The method in FIG. 2 is executed by the optical module no in FIG. 1, and includes the following content.

210: An optical module generates a first packet according to a service packet that passes through the optical module, where a source address of the first packet is the same as a source address of the service packet, a destination address of the first packet is the same as a destination address of the service packet, the first packet further includes an identifier of the optical module and feature information, where the feature information is used to indicate that a packet including the feature information is an optical module management packet, and the first packet is used to snoop whether a first transmission path from the optical module to a network device exists. The optical module management packet is used for communication between the optical module and the network device.

For example, the optical module may randomly acquire address information of the service packet, and then generate the first packet by using the address information. The address information of the service packet may include the source address and the destination address. When generating the first packet by using the address information of the service packet, the optical module may use the destination address of the service packet as the destination address of the first packet, use the source address of the service packet as the source address of the first packet, and then add the identifier of the optical module and the feature information to the first packet.

220: The optical module sends the first packet in a transmission direction of the service packet.

For example, when the optical module is in an uplink (UP) mode, the optical module receives a packet that is transmitted in a direction toward the host device, and sends the first packet in the direction (that is, the uplink direction, or the UP direction) toward the host device. When the optical module is in a downlink (DOWN) mode, the optical module receives a packet that is transmitted in a direction away from the host, and sends the first packet in the direction (which is a downlink direction, or a DOWN direction) away from the host device. When the optical module is in a middle (MIDDLE) mode, the optical module receives packets that are transmitted in the UP and DOWN directions, and sends the first packet in the respective transmission directions (that is, the UP direction and the DOWN direction) of the packets.

230: The optical module receives a second packet sent by the network device, where the second packet is used to respond to the first packet, and the second packet is used to indicate that the first transmission path from the optical module to the network device exists, and instruct the optical module to communicate with a network management system by using the network device and the first transmission path, where a communication path exists between the network device and the network management system, the second packet includes the identifier of the optical module and the feature information, and a destination address of the second packet is the same as the source address of the first packet.

The network device may include a CTP unit. For example, when the network device is a router, the network device may include a CTP logical functional entity. Alternatively, the network device may also be an independent CTP device. The communication path exists between the network device and the network management system. For example, the network device may communicate with the network management system by using an IP protocol address, that is, the network device may have an independent IP address. The network device may send a received packet to the network management system by using the CTP unit.

If the network device disposed in a network receives the first packet, the network device may generate the second packet according to the first packet, for example, use the source address of the first packet as the destination address of the second packet, use the destination address of the first packet as the source address of the second packet, and send the second packet to the optical module. When receiving the second packet sent by the network device, the optical module may determine that the first transmission path exists between the optical module and the network device.

According to the technical solution of this embodiment, a packet is generated according to a service packet that passes through an optical module, the packet is sent in a transmission direction of the service packet, and a transmission path between the optical module and a network device is determined according to a packet returned by the network device. Because there is a communication path between the network device and a network management system, the optical module may communicate with the network management system by using the network device without requiring a host device to provide a data reporting service to the optical module. Therefore, in a case in which the host device of the optical module is not reconstructed, the optical module can send data to the network management system, thereby reducing reconstruction costs of a network and impact on the original network.

According to this embodiment, the first packet includes an IP packet header, a Protocol field in the IP packet header identifies that the IP packet header is used to encapsulate an Internet Control Message Protocol (ICMP) packet, a type field of the ICMP packet is set to an echo reply, and the ICMP packet includes the feature information. The ICMP packet is set to an Echo Reply packet. Therefore, even if the packet is received by a device that should not receive the optical module management packet, the device is not adversely affected, thereby improving network security.

It should be understood that, the first packet may include a message type of the first packet, where the message type is used to identify the first packet.

It should be understood that, the second packet indicates that the optical module may communicate with the network management system by using the network device and the first transmission path, where after the optical module receives the second packet, it indicates that it is determined that the first transmission path exists, and therefore if the optical module needs to report data information to the network management system, the optical module may communicate with the network management system through the first transmission path.

Specifically, when receiving a packet, the optical module may perform detection on the packet, for example, in a snooping manner. If the packet includes feature information and the packet includes the identifier of the optical module, the optical module chooses to receive the packet. If the packet includes the message type of the second packet, the optical module determines that the packet is the second packet, where the message type of the second packet is used to identify the second packet. In addition, the optical module may periodically receive the second packet, or may choose to receive only the first of multiple second packets. When multiple network devices exist, the optical module may choose to receive the first of multiple second packets that are sent by each network device.

According to this embodiment, an optical module may send a packet that includes measurement data to a network device through a first transmission path. Preferably, the optical module may generate a packet that includes measurement data by using address information corresponding to the first transmission path, and then send the packet.

Optionally, as another embodiment, the communication method in FIG. 2 may further include: generating, by the optical module, a third packet according to the second packet, where the third packet includes the identifier of the optical module and the feature information, and the third packet is used to notify the network device that a second transmission path from the network device to the optical module exists; and sending, by the optical module, the third packet through the first transmission path. Optionally, the third packet may further include an identifier of the network device.

In other words, when the network device receives the third packet sent by the optical module, it is determined that bidirectional transmission paths, that is, the first transmission path and the second transmission path, exist between the network device and the optical module.

Optionally, as another embodiment, a source address carried in the second packet is the destination address of the first packet. After the receiving, by the optical module, a second packet sent by the network device, the communication method in FIG. 2 may further include: recording, by the optical module, information about the first transmission path in a path table of the optical module, where the information about the first transmission path includes the destination address of the first packet.

It should be understood that, the source address of the first packet, in addition to the destination address of the first packet, may further be recorded in the information about the first transmission path. Alternatively, the source address carried in the second packet is an address of the network device, where the information about the first transmission path includes the address of the network device. After the receiving, by the optical module, a second packet sent by the network device, the communication method in FIG. 2 further includes: recording, by the optical module, information about the first transmission path in a path table of the optical module, where the information about the first transmission path includes the address of the network device.

Alternatively, complete information about the packet header of the first packet may be recorded in the information about the first transmission path, so as to encapsulate, by using the packet header, measurement data that needs to be reported to the network management system; and when the source address carried in the second packet is the address of the network device, the information about the first transmission path may include the address of the network device, and the destination address in the packet header of the first packet may be replaced with the address of the network device.

If the optical module receives second packets sent by multiple network devices, multiple first transmission paths may exist in the path table of the optical module, and each first transmission path of the multiple first transmission paths may be distinguished by using address information of a first packet, and/or by using an identifier of each network device of the multiple network devices.

It should be understood that, the path table of the optical module may further include a sending direction of the first packet and an identifier of the network device, and indicate a mapping relationship between the information and the destination address of the first packet.

Optionally, as another embodiment, after the receiving, by the optical module, a second packet sent by the network device, the communication method in FIG. 2 further includes: generating and sending, by the optical module, a fourth packet according to the information about the first transmission path, where the fourth packet is used to report measurement data to the network management system, and the fourth packet includes the feature information.

It should be understood that, the fourth packet may further include a message type of the fourth packet, where the message type is used to identify the fourth packet. The optical module uses the measurement data that needs to be reported as a payload of the fourth packet, and adds feature information to generate the fourth packet. For a method of obtaining a packet header of the fourth packet, for example, if the complete information about the packet header of the first packet is recorded in the path table of the optical module, the optical module uses the packet header, recorded in the path table of the optical module, of the first packet, as the packet header of the fourth packet; otherwise, the optical module may generate the packet header of the fourth packet according to the address information, recorded in the path table, of the first packet.

When the source address carried in the second packet is an address of the network device, in the packet header of the first packet, the destination address may be replaced with the address of the network device, to obtain a new packet header, and the optical module adds feature information according to the new packet header, to generate the fourth packet; or the packet header of the fourth packet may be generated according to the recorded address of the network device.

It should be understood that, if multiple first transmission paths exist in the path table of the optical module, the optical module may select multiple first transmission paths thereof, to generate multiple fourth packets.

After generating the fourth packet, the optical module sends the fourth packet in a direction recorded in the first transmission path.

Optionally, as another embodiment, after the recording, by the optical module, information about the first transmission path in a path table of the optical module, the communication method in FIG. 2 further includes: sending, by the optical module, a maintenance message to the network device, where the maintenance message is used to determine whether the first transmission path is available; and if the optical module receives, within a preset period of time, a maintenance reply message sent by the network device, determining that the first transmission path is available, where the maintenance reply message is used to respond to the maintenance message; or if the optical module does not receive, within a preset period of time, a maintenance reply message sent by the network device, deleting the information about the first transmission path from the path table of the optical module.

It should be understood that, the optical module may send the maintenance message to the network device according to a predetermined cycle, and when the maintenance reply message is not received after the maintenance message is sent for a predetermined number of times, the optical module chooses to delete the information about the first transmission path corresponding to the network device from the path table. For example, the optical module sends the maintenance message to the network device at an interval of three seconds, and when the maintenance reply message is not received after the maintenance reply message is sent three times, the optical module deletes the information about the first transmission path from the path table of the optical module.

In addition, it should be understood that, the feature information is used to identify the optical module management packet; however, feature information of different optical module management packets may be different.

FIG. 3 is a schematic flowchart of a communication method according to another embodiment. The method in FIG. 3 is executed by a network device, and includes the following content. The embodiment in FIG. 3 corresponds to the embodiment in FIG. 2, and detailed description is properly omitted herein.

310: A network device receives a first packet sent by an optical module, where a communication path exists between the network device and a network management system, the first packet is generated by the optical module according to a service packet that passes through the optical module, a source address of the first packet is the same as a source address of the service packet, a destination address of the first packet is the same as a destination address of the service packet, and the first packet includes an identifier of the optical module and feature information, where the feature information is used to indicate that a packet including the feature information is an optical module management packet, and the first packet is used to snoop whether a first transmission path from the optical module to the network device exists.

320: The network device generates a second packet according to the first packet, where a destination address of the second packet is the same as the source address of the first packet, the second packet is used to respond to the first packet, the second packet is used to indicate that the first transmission path from the optical module to the network device exists, and instruct the optical module to communicate with the network management system by using the network device and the first transmission path, and the second packet includes the identifier of the optical module and the feature information.

330: The network device sends the second packet to the optical module.

According to this embodiment, a network device may generate a second packet according to a first packet sent by an optical module, and return the second packet to the optical module, so that the optical module determines a transmission path between the optical module and the network device according to the second packet returned by the network device. Because there is a communication path between the network device and a network management system, the optical module may communicate with the network management system by using the network device without requiring a host device to provide a data reporting service to the optical module. Therefore, in a case in which the host device of the optical module is not reconstructed, the optical module can send data to the network management system, thereby reducing reconstruction costs of a network and impact on the original network.

Specifically, when receiving a packet, the network device may perform detection on the packet, for example, similar to the optical module, in a snooping manner. If the packet includes feature information, the network device chooses to receive the packet; and if the packet includes a message type of the first packet, the network device determines that the packet is the first packet.

It should be understood that, when a VPN exists in the network, the first packet may further include a VPN identifier. The network device may acquire address information from the first packet, switch the source address and the destination address that are in the address information, to obtain a new source address and destination address, and generate the second packet according to the new source address and destination address. When the first packet enters the network device, the network device may acquire the VPN identifier of the first packet. The network device acquires, from a routing table or a Media Access Control (MAC) table, information about an egress interface corresponding to the second packet according to the VPN identifier of the first packet and the address information of the second packet, and then sends the second packet.

It should be understood that, when sending the second packet to the optical module, the network device may periodically send the second packet to each optical module, or may send the second packet to each optical module once.

Optionally, as another embodiment, after the receiving, by a network device, a first packet sent by an optical module, the communication method in FIG. 3 may further include: sending, by the network device, a fifth packet to the network management system, where the fifth packet includes the identifier of the optical module and an identifier of the network device, and the fifth packet is used to notify the network management system of the identifier of the optical module and the identifier of the network device.

It should be understood that, the network device not only may report measurement data when the network management system requests to report the measurement data, but also may actively report the measurement data, for example, periodically report the measurement data.

Optionally, as another embodiment, the communication method in FIG. 3 may further include: receiving, by the network device, a third packet sent by the optical module, where the third packet includes the identifier of the optical module and the feature information, and the third packet is used to notify the network device that a second transmission path from the network device to the optical module exists.

The network device receives the third packet sent by the optical module, thereby determining that the second transmission path exists. Therefore, the network device can send a packet to the optical module by using the second transmission path. For example, the packet may be used by the network device to collect the measurement data of the optical module.

Optionally, as another embodiment, after the receiving, by a network device, a third packet sent by an optical module, the communication method in FIG. 3 may further include: sending, by the network device, a fifth packet to the network management system, where the fifth packet includes the identifier of the optical module and an identifier of the network device, and the fifth packet is used to notify the network management system of the identifier of the optical module and the identifier of the network device.

For example, the network device sends the fifth packet to the network management system according to the third packet. The fifth packet may include the identifier of the optical module and the identifier of the network device, and the fifth packet is used to notify the network management system that a transmission path is established between the optical module and the network device. After receiving the third packet, the network device already determines that bidirectional paths exist between the optical module and the network device. If it is after receiving the third packet that the network device sends the fifth packet to the network management system, it can be further ensured that a packet sent by the network management system to the optical module can reach the optical module, because in this case, the network device already determines that the bidirectional paths exist between the optical module and the network device.

For example, the network device may collect in advance measurement data reported by the optical module, and after receiving a request, for reporting measurement data, sent by the network management system, report the measurement data to the network management system; or the network management system may request, by using the network device, the optical module to report measurement data, and the optical module reports the measurement data to the network management system by using the network device.

Optionally, as another embodiment, after the receiving, by the network device, a third packet sent by the optical module, the communication method in FIG. 3 may further include: recording, by the network device, information about the second transmission path in a path table of the network device, where the information about the second transmission path includes a mapping relationship among an egress interface, the destination address of the second packet, and the identifier of the optical module, and the egress interface is an interface for the network device to send the second packet.

It should be understood that, the path table of the network device may further include the destination address of the second packet (that is, the source address of the first packet) or the address information of the second packet, where the address information includes the source address and the destination address of the second packet.

The information about the second transmission path is recorded in the path table, and therefore when sending a packet to an optical module, the network device can select a path, the optical module, and an egress interface that corresponds to the optical module. For example, when selecting a path, the network device may select an available path or a preferred path.

After receiving the fifth packet, the network management system stores an identifier of the optical module and an identifier of the network device that are carried in the fifth packet, thereby acquiring which optical module may be reached from which network device. The network management system may deliver configuration information to or request measurement data from a specific optical module according to the identifier of the optical module and the identifier of the network device. An existing network management protocol such as the Simple Network Management Protocol (SNMP) may be used between the network management system and the network device. An example in which the network management system delivers the configuration information to the optical module is used. After receiving a packet for configuring the optical module from the network management system, the network device extracts configuration data carried in the packet, generates a sixth packet according to the information, recorded in the path table of the network device, about the second transmission path, and sends the sixth packet to the optical module through the egress interface recorded in the second transmission path. The sixth packet includes the feature information, and may further include a message type of the sixth packet and the identifier of the optical module. The sixth packet may be a packet that is sent by the network device to the optical module after the network device receives a packet, for requesting measurement data, of the network management system. Alternatively, the sixth packet may also be a management packet that is used for configuration information and is sent by the network device to the optical module after the network management system delivers the configuration information to the optical module. Optionally, as another embodiment, the communication method in FIG. 3 may further include: if the network device receives a maintenance message sent by the optical module, sending, by the network device, a maintenance reply message according to the maintenance message, where the maintenance message is used to determine whether the first transmission path between the optical module and the network device is available, and the maintenance reply message is used to respond to the maintenance message.

It should be understood that, if the optical module periodically sends the maintenance message, the path table of the network device may further include an aging value, where the aging value is used to indicate an availability state of a path. For example, the network device may set the aging value to 0 when receiving the maintenance message of the optical module; if the network device does not receive the maintenance message of the optical module within a predetermined cycle, the network device adds 1 to the aging value, and after receiving the maintenance message, resets the aging value to 0. It may also be set that if the maintenance message is not received within a specific cycle (for example, two cycles), a path corresponding to the optical module is deleted from the path table.

It should be understood that, as an exemplary embodiment, the first packet includes an IP packet header, a Protocol field in the IP packet header identifies that the IP packet header is used to encapsulate an ICMP packet, a type field of the ICMP packet is set to Echo Reply, and the ICMP packet includes feature information. The ICMP packet is set to a special Echo Reply packet. Therefore, even if the packet is received by a device that should not receive the optical module management packet, the device is not adversely affected, thereby improving network security.

Figure 4A:
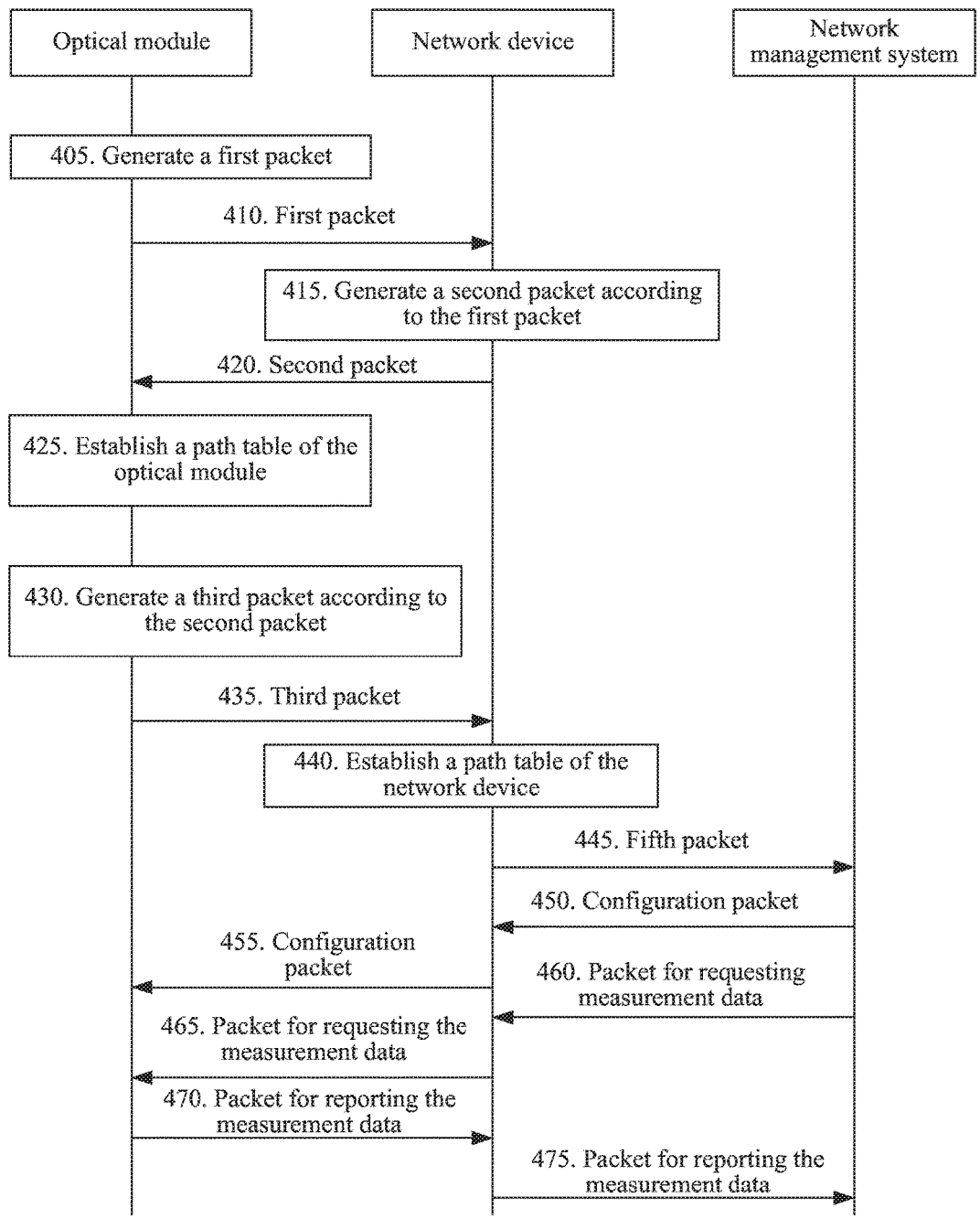
FIG. 4A is a schematic flowchart of a communication method according to still another embodiment.

FIG. 4A is a schematic flowchart of a communication method according to still another embodiment. The flowchart shows an interaction relationship among an optical module, a network device, and a network management system. The method in FIG. 4A is an example of the methods in FIG. 2 and FIG. 3, and detailed description is properly omitted herein.

405: An optical module generates a first packet according to a service packet that passes through the optical module.

The optical module may randomly acquire a service packet that passes through the optical module, and then generate the first packet by using address information of the service packet, where the first packet has a path snooping function, and is used to determine a first transmission path from the optical module to the network device.

For example, the optical module may copy a packet header of the service packet, upgrade the service packet to an ICMP echo reply packet that has a specific value, and add feature information to the packet. Certainly, it may also be that, the packet header of the service packet is not changed, while a payload part of the service packet is set to the feature information; or address information in the packet header of the service packet is not changed, while some fields in the packet header of the service packet are set to the feature information. In addition, an identifier of the optical module may further be added to the first packet.

410: The optical module sends the first packet along a transmission path of the service packet, and a network device receives the first packet sent by the optical module.

Figure 4B:
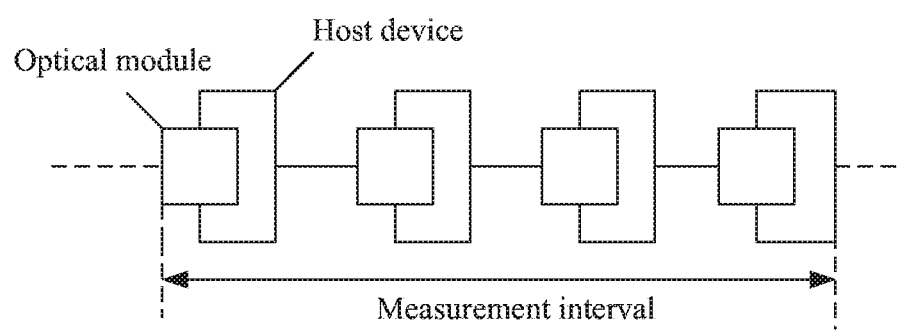
FIG. 4B is a schematic diagram of a working mode of an optical module according to an embodiment.

In this embodiment, a working mode of optical module may further be determined according to a position, in a measurement interval, of the optical module. For example, as shown in FIG. 4B, multiple optical modules are distributed in a measurement interval, where the measurement interval is an interval in which multiple optical modules are distributed in a communications system. When the optical module is on a boundary of the measurement interval and a host device of the optical module and the measurement interval are located on a same side of the optical module, it is defined that the optical module is in an UP (uplink) mode, where in this mode, the optical module acquires a packet that is transmitted in a direction toward the host device, and sends the packet in the direction (an UP direction) toward the host device. When the optical module is on the boundary of the measurement interval and the host device of the optical module and the measurement interval are located on two sides of the optical module, it is defined that the optical module is in a DOWN (downlink) mode, where in this mode, the optical module acquires a packet that is transmitted in a direction away from the host device, and sends the packet in the direction (a DOWN direction) away from the host device. When the optical module is not on the boundary of the measurement interval, it is defined that the optical module is in a MIDDLE (middle) mode, where in this mode, the optical module acquires service packets in the UP and DOWN directions, and sends the service packets in the UP and DOWN directions. The optical module is in the MIDDLE mode, and therefore, the optical module may acquire service packets from the two sides, and a direction in which the optical module sends the first packet may be the UP direction toward the side of the host device, or may be the DOWN direction away from the side of the host device.

The network device may receive a first packet in a snooping manner, for example, may determine the first packet by identifying feature information of the packet and a message type of the first packet. For example, it may be determined according to the feature information that the packet is an optical module management packet, and may be determined according to the message type of the first packet that the packet is the first packet.

The optical module may generate a path learning table, to record a first packet that is sent each time. As shown in Table 1, the path learning table includes the following entries: a packet header of the first packet, a sending direction of the first packet, and the like, where extracted address information of the first packet or destination address of the first packet is recorded in the packet header of the first packet, and the packet header may be further used to identify a path along which the optical module sends a packet. The sending direction of the first packet may be defined as follows: for example, when the optical module sends the first packet along a transmission path of the service packet, a direction of sending toward the side of the host device is the UP direction, and a direction of sending away from the side of the host device is the DOWN direction.

For example, the path table of the optical module further includes a path identifier of the optical module. Alternatively, the path identifier is used to identify a path along which the optical module sends a packet. For example, in the embodiment in FIG. 4, the first transmission path is identified by using the path identifier of the optical module.

TABLE 1

| No | Path identifier of the optical module | Packet header of the first packet | Sending direction of the first packet |
|---|---|---|---|
| 0 | | | |
| 1 | | | |
| ... | | | |
| 15 | | | |

415: The network device generates a second packet according to the first packet.

After detecting the first packet, the network device generates the second packet according to the address information of the first packet, where the second packet is used to respond to the first packet. Specifically, the network device switches a source address and a destination address of the first packet, for use as a source address and a destination address of the second packet, that is, uses the source address of the first packet as the destination address of the second packet, and uses the destination address of the first packet as the source address of the second packet. When receiving the first packet, the network device determines an ingress interface of the first packet according to a port by using which the first packet enters the network device. When a VPN network exists in a network, the network device further acquires a VPN identifier of the first packet when the first packet enters the network device, for example, a Virtual Routing and Forwarding (VRF) identifier in a layer 3 (L3) VPN network or a Virtual Switching Instance (VSI) identifier in a layer 2 (L2) VPN network. Next, the network device obtains, from a routing table or a MAC table, an egress interface of the second packet and a packet header of the second packet according to the ingress interface of the first packet, address information of the second packet, and the acquired VPN identifier.

420: The network device sends the second packet, and the optical module receives the second packet sent by the network device.

The network device may periodically send the second packet to the optical module, and the optical module also receives the second packet in a snooping manner. Specifically, the second packet may be determined by identifying the feature information of the packet and the message type of the second packet. At the same time, the optical module receives only the first of multiple second packets. For example, it may be determined according to the feature information that the packet is an optical module management packet, and it may be determined according to the message type of the first packet that the packet is the first packet.

In addition, the network device may generate a path learning table of the network device, as shown in Table 2. The network device records information about the first packet in the path learning table, where the path learning table of the network device may include the following entries: an identifier of the optical module, a packet header of the second packet, and a sending direction of the first packet, where the address information of the second packet may be recorded in the packet header of the second packet, and information in the packet header of the second packet may be further used to identify a path along which the network device sends a packet to the optical module. The path table of the network device may further include a path identifier of the network device. Alternatively, the path identifier is used to identify a path along which the network device sends a packet to the optical module. In the embodiment in FIG. 4A, the second transmission path is identified by using the path identifier of the network device.

For example, the path learning table of the network device may further include an ingress interface and a VPN identifier of the network device, where the network device may acquire the ingress interface of the first packet according to a port by using which the first packet is received. In addition, if a VPN network exists in a network, the network device further acquires a virtual switching interface VPN identifier of the first packet when receiving the first packet, for example, a VRF identifier in a layer 3 (L3) VPN network or a VSI identifier in a layer 2 (L2) VPN network.

TABLE 2

| No. | Identifier of the optical module | Sending direction of the first packet | Packet header of the second packet | VPN identifier | Path identifier of the optical module | Path identifier of the network device | Ingress interface |
|---|---|---|---|---|---|---|---|
| 0 | | | | | | | |
| 1 | | | | | | | |
| ... | | | | | | | |
| 15 | | | | | | | |

425: After receiving the second packet, the optical module generates a path table of the optical module according to the second packet.

The optical module receives the second packet sent by the network device. It indicates that the network device receives the first packet sent by the optical module, that is, the first transmission path from the optical module to the network device is determined. Further, the optical module may record the information about the first transmission path in the path table of the optical module. For example, after receiving the second packet sent by the network device, the optical module finds a corresponding path in the path learning table according to the path identifier of the optical module, and records the information about the first transmission path in the path table of the optical module. The information about the first transmission path may further include the identifier of the network device. As shown in Table 3, compared with the path learning table, the path table of the optical module may further include the identifier of the network device and the path identifier of the network device, where the identifier of the network device instructs the optical module to send a packet by using a specific network device.

TABLE 3

| No. | Aging value | Path identifier of the network device | Identifier of the network device | Path identifier of the optical module | Packet header of the first packet | Sending direction of the first packet |
|---|---|---|---|---|---|---|
| 0 | | | | | | |
| 1 | | | | | | |
| ... | | | | | | |
| 15 | | | | | | |

430: The optical module generates a third packet according to the second packet.

Specifically, the optical module encapsulates the third packet by using the information, about the first transmission path, that correspond to the network device and is in the path table of the optical module.

435: The optical module sends the third packet through a first transmission path, and the network device receives the third packet sent by the optical module.

The network device may receive a third packet in a snooping manner, and specifically, may determine the third packet by identifying feature information of the packet and a message type of the third packet. For example, it may be determined according to the feature information that the packet is an optical module management packet, and it may be determined according to the message type of the first packet that the packet is the first packet. When the network device receives the third packet sent by the optical module, it indicates that the second transmission path from the network device to the optical module exists. The network device may send a packet to the optical module by using the second transmission path.

440: After receiving the third packet, the network device generates a path table of the network device.

After the network device receives the third packet sent by the optical module, it indicates that the second transmission path from the network device to the optical module is determined, and the network device generates the path table of the network device, where compared with the path learning table, the path table includes an established available path. As shown in Table 4, the path table includes a packet header of the second packet, an identifier of the optical module, an identifier of the network device, a path identifier of the optical module, and a path identifier of the network device. The path table may further include an egress interface, a destination address of the second packet, and information about a VPN identifier. When sending a packet to a specific optical module, the network device finds, in the path table of the network device, an identifier of the optical module and the packet header of the second packet, and sends the packet to the optical module by using a corresponding egress interface. For example, the network device may send, according to a path recorded in the path table, a packet used to manage and configure the optical module.

TABLE 4

| No. | Aging value | Identifier of the optical module | Path identifier of the optical module | Path identifier of the network device | Egress interface | Packet header of the second packet | VPN identifier |
|---|---|---|---|---|---|---|---|
| 0 | | | | | | | |
| 1 | | | | | | | |
| ... | | | | | | | |
| 15 | | | | | | | |

In addition, after determining the path between the optical module and the network device, the network management system records the information about the optical module, and at the same time a bidirectional channel is established between the optical module and the network management system. However, a state of the network may change, and sometimes an established path is not always available. Therefore, a mechanism is needed to perform path maintenance, so as to establish a new path when the path is unavailable.

The path table of the optical module may further include the aging value. The path maintenance may be performed by using a keep-alive maintenance message. For each path in the path table of the optical module, at a particular time interval of, for example, three seconds, the optical module sends a keep-alive message to a corresponding network device. If receiving the keep-alive maintenance message, the network device returns a maintenance reply message. If the optical module does not receive a maintenance reply message after consecutively sending a keep-alive maintenance message three times, the optical module determines that the path between the optical module and the network device is unavailable, and deletes information about the path from the path table of the optical module. If the path table of the optical module becomes empty after the information about the path is deleted, the optical module may restart a path learning process.

It should be understood that, the optical module may perform path maintenance after it is determined that a first path exists. That is, the network device performs path maintenance without determining that a second path exists.

The path table of the network device may include the aging value, and when the network device determines that the second path exists and generates the path table of the network device, the network device may use a sending interval of a keep-alive message, sent by the optical module, as a path maintenance cycle. After receiving a maintenance message from the optical module, the network device increases the aging value of the path by 1 in the path table after every path maintenance cycle, and the network device resets the aging value of the path to 0 every time the network device receives one maintenance message from the optical module.

445: The network device sends a fifth packet to a network management system.

The network device sends the fifth packet to the network management system according to the third packet, where the fifth packet is used to notify the network management system of an established path, and the fifth packet includes the identifier of the optical module, and may further include the identifier of the network device. For example, the network device may communicate with the network management system by using an independent IP address. After receiving the fifth packet, the network management system may record information that is in the fifth packet.

450: The network management system sends, to the network device, a configuration packet used to configure the optical module.

The network management system may deliver, by using the network device, a packet for managing the optical module, where the packet may include configuration information, the identifier of the optical module, the identifier of the network device, and the like. The identifier of the optical module and the identifier of the network device are used to send a packet to a specific optical module by using a specific network device. For example, a source address of the packet may be an IP address of the network management system, and a destination address of the packet may be an IP address of the network device.

455: The network device sends, to the optical module, a configuration packet used to configure the optical module.

The network device may generate, according to the packet, a packet used to manage the optical module, and then send the generated packet to the optical module. For example, the network device may extract configuration information from the configuration packet, and encapsulate the configuration information into a configuration packet according to address information corresponding to the second transmission path. The network device sends the encapsulated configuration packet to the optical module according to a mapping relationship between the second transmission path in the path table and a corresponding egress interface.

According to this embodiment, a packet (that is, the optical module management packet) for communication between the optical module and the network device may be in a format shown in Table 5:

TABLE 5

| Non-L3 header | | | |
|---|---|---|---|
| version | IHL | type of service | total length |
| | identification | flags | fragment offset |
| time to live | | protocol = 1 (ICMP) | header checksum |
| | | source address | |
| | | destination address | |
| type = 0 (echo reply) | | code = 0 | checksum = 0 |
| | identifier = 0xFFFE | | sequence number = 0xFFFE |
| | SFP message eigenvalue = 0xA5A55A5A | | |
| ver = 1 | | 0 | message type    serial number |
| | | SFP ID | |
| | | CTP ID | |
| SFP SN | | | CTP SN |
| | | data | | where SFP: Small Form-factor Pluggable, that is, small form-factor pluggable (that is, the optical module); and CTP: Conversation Transfer Point, a conversation transfer point.

The following provides meanings of the fields, from the top to the bottom, in the foregoing table:

non-L3 header: including a layer 2 header and a possible Multiprotocol Label Switching (MPLS) header;

Version: a version; that is, an IP version number, and for the IPv4, the value of this field is 4;

IHL: IP Header Length, that is, a length of an IP header;

type of service: the type of a service;

total length: a total length, referring to a total length of an IP packet;

identification: an identifier of an IP packet, used to identify the IP packet during fragment reassembly;

flags: flags, that is, fragmentation control flags, used to control fragmentation and reassembly of an IP packet;

fragment offset: a fragment offset;

time to live: a time to live, that is, maximum duration that the packet can exist in a network before the packet arrives at a destination;

protocol: a protocol;

header checksum: a header checksum, that is, an IP header checksum;

source address: a source address, that is, a source IP address;

destination address: a destination address, that is, a destination IP address;

type: a type;

code: code;

checksumL: a checksum;

identifier: an identifier;

sequence number: a sequence number;

SFP message eigenvalue: an optical module packet eigenvalue;

Ver: a version;

message type: a message type, used to indicate different packets used in communication between the optical module and the network device;

serial number: a serial number;

SFP ID: an identifier of the optical module;

CTP ID: a CTP identifier, that is, an identifier of the network device;

SFP SN: a serial number of the optical module (a path identifier of the optical module);

CTP SN: a serial number of the CTP (a path identifier of the network device); and Data: data.

According to this embodiment, preferably, a value of a protocol (protocol) is set to 1, so that even if the optical module management packet is sent to a device other than the optical module and the network device, no damage is caused to these devices. Preferably, the feature information herein may be the optical module packet eigenvalue (SFP message eigenvalue); or an SFP message eigenvalue and another field may be combined as the feature information. For example, values of the fields identifier and sequence number are set to specific values, and the fields identifier, sequence number, and SFP message eigenvalue are combined into a message type (message type) of the feature information, to indicate different packets used in communication between the optical module and the network device.

It should be understood that, for convenience of description, Table 5 is only a specific example of the optical module management packet, and this embodiment is not limited to the foregoing specific fields.

Figure 5:
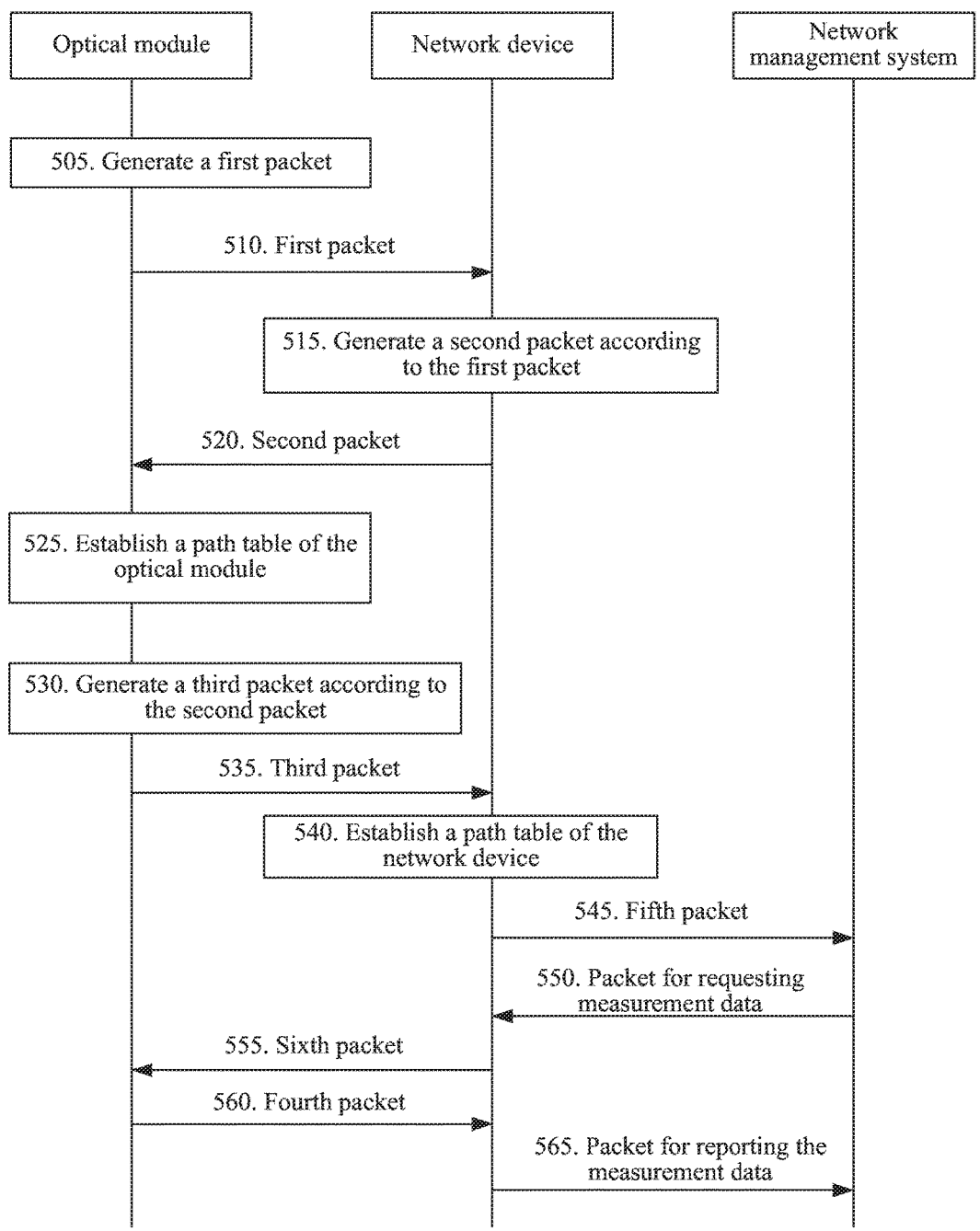
FIG. 5 is a schematic diagram of a working mode of an optical module according to an embodiment.

FIG. 5 is a schematic flowchart of a communication method according to an embodiment. The flowchart shows an interaction relationship among an optical module, a network device, and a network management system. The method in FIG. 5 is an example of the methods in FIG. 2 and FIG. 3, and detailed description is properly omitted herein.

505: An optical module generates a first packet according to a service packet that passes through the optical module.

510: The optical module sends the first packet along a transmission path of the service packet, and a network device receives the first packet sent by the optical module.

515: The network device generates a second packet according to the first packet.

520: The network device sends the second packet, and the optical module receives the second packet sent by the network device.

525: After receiving the second packet, the optical module generates a path table of the optical module according to the second packet.

530: The optical module generates a third packet according to the second packet.

535: The optical module sends the third packet through a first transmission path, and the network device receives the third packet sent by the optical module.

540: After receiving the third packet, the network device generates a path table of the network device.

545: The network device sends a fifth packet to a network management system.

505 to 545 in FIG. 5 are similar to 405 to 445 in FIG. 4A, and therefore detailed description is properly omitted.

550: The network management system sends, to the network device, a packet used to request measurement data.

The network management system may send, by using the network device, a packet for requesting measurement data, where the packet may include measurement request information, and the measurement request information may be an identifier of the optical module, an identifier of the network device, and the like. The identifier of the optical module and the identifier of the network device are used to send a packet to a specific optical module by using a specific network device. For example, a source address of the packet may be an IP address of the network management system, and a destination address of the packet may be an IP address of the network device.

555: The network device sends a sixth packet to the optical module.

The network device may generate, according to the packet, an optical module management packet used to request measurement data, and then send the optical module management packet to the optical module. For example, the network device may extract measurement request information from the configuration packet, and encapsulate the measurement request information into a packet according to address information corresponding to a second transmission path. The network device may send the packet according to the second transmission path, from the network device to the optical module, recorded in the path table of the network device.

560: The optical module sends a fourth packet through the first transmission path.

The optical module may collect measurement data, and when receiving a packet used to request the measurement data, send, through the first transmission path, a packet that carries the measurement data.

565: The network device sends, to the network management system, a packet that carries the measurement data.

After receiving the packet that carries the measurement data and is sent by the optical module, the network device may send, to the network management system, the packet that carries the measurement data after receiving the packet that is for requesting the measurement data and is sent by the network management system. For example, the network device may extract the measurement data from the packet, and encapsulate the measurement data into a packet by using the IP address of the network device as a source address and using an IP address of the network management system as a destination address.

Figure 6:
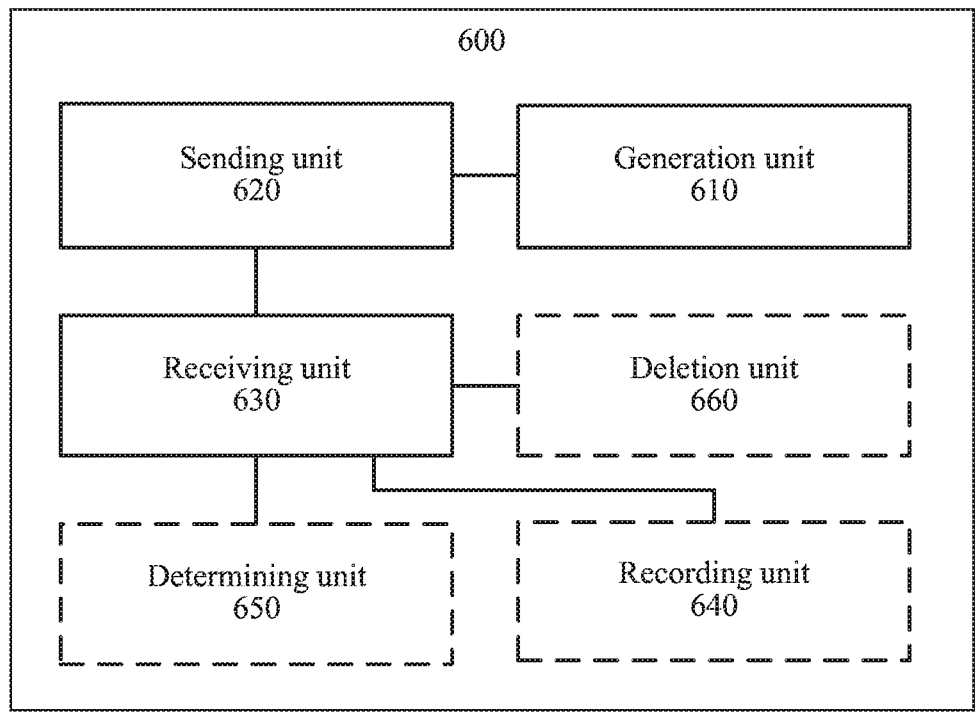
FIG. 6 is a schematic structural diagram of an optical module according to an embodiment.

FIG. 6 is a schematic structural diagram of an optical module 600 according to an embodiment. The optical module 600 includes a generation unit 610, a sending unit 620, and a receiving unit 630.

The generation unit 610 is configured to generate a first packet according to a service packet that passes through the optical module, where a source address of the first packet is the same as a source address of the service packet, a destination address of the first packet is the same as a destination address of the service packet, the first packet further includes an identifier of the optical module and feature information, where the feature information is used to indicate that a packet including the feature information is an optical module management packet, and the first packet is used to snoop whether a first transmission path from the optical module to a network device exists; the sending unit 620 is configured to send the first packet in a transmission direction of the service packet; and the receiving unit 630 is configured to receive a second packet sent by the network device, where the second packet is used to respond to the first packet, and the second packet is used to indicate that the first transmission path from the optical module to the network device exists, and instruct the optical module to communicate with a network management system by using the network device and the first transmission path, where a communication path exists between the network device and the network management system, the second packet includes the identifier of the optical module and the feature information, and a destination address of the second packet is the same as the source address of the first packet.

According to the technical solution of this embodiment, a packet is generated according to a service packet that passes through an optical module, the packet is sent in a transmission direction of the service packet, and a transmission path between the optical module and a network device is determined according to a packet returned by the network device. Because there is a communication path between the network device and a network management system, the optical module may communicate with the network management system by using the network device without requiring a host device to provide a data reporting service to the optical module. Therefore, in a case in which the host device of the optical module is not reconstructed, the optical module can send data to the network management system, thereby reducing reconstruction costs of a network and impact on the original network.

According to this embodiment, the generation unit 610 is further configured to generate a third packet according to the second packet, where the third packet includes the identifier of the optical module and the feature information, and the third packet is used to notify the network device that a second transmission path from the network device to the optical module exists; and the sending unit 620 is further configured to send the third packet through the first transmission path.

Optionally, the optical module 600 may further include: a recording unit 640, where a source address carried in the second packet is the destination address of the first packet, and the recording unit 640 is configured to: after the receiving unit 630 receives the second packet sent by the network device, record, in a path table of the optical module, information about the first transmission path, where the information about the first transmission path includes the destination address of the first packet.

Optionally, the optical module 600 further includes: a recording unit 640, where a source address carried in the second packet is an address of the network device, and the recording unit 640 is configured to: after the receiving unit 630 receives the second packet sent by the network device, record, in a path table of the optical module, information about the first transmission path, where the information about the first transmission path includes the address of the network device.

Optionally, as another embodiment, the optical module further includes a determining unit 650 and a deletion unit 660, the sending unit 620 is further configured to: after the recording unit 640 records, in the path table of the optical module, the information about the first transmission path, send a maintenance message to the network device, where the maintenance message is used to determine whether the first transmission path is available, the determining unit 650 is configured to: if the receiving unit 630 receives, within a preset period of time, a maintenance reply message sent by the network device, determine that the first transmission path is available, and the deletion unit 660 is configured to: if the receiving unit 630 does not receive, within a preset period of time, a maintenance reply message sent by the network device, delete the information about the first transmission path from the path table of the optical module, where the maintenance reply message is used to respond to the maintenance message.

Optionally, the sending unit 620 further generates and sends a fourth packet according to the information about the first transmission path after the receiving unit 630 receives the second packet sent by the network device, where the fourth packet is used to report measurement data to the network management system, and the fourth packet includes the feature information.

Optionally, the first packet includes an IP packet header, a protocol field in the IP packet header identifies that the IP packet header is used to encapsulate an ICMP packet, a type field of the ICMP packet is set to an echo reply, and the ICMP packet includes the feature information.

The optical module 600 may perform the corresponding steps in the methods in the embodiments corresponding to FIG. 2, FIG. 4A, and FIG. 5. To avoid repetition, details are not provided again herein.

Figure 7:
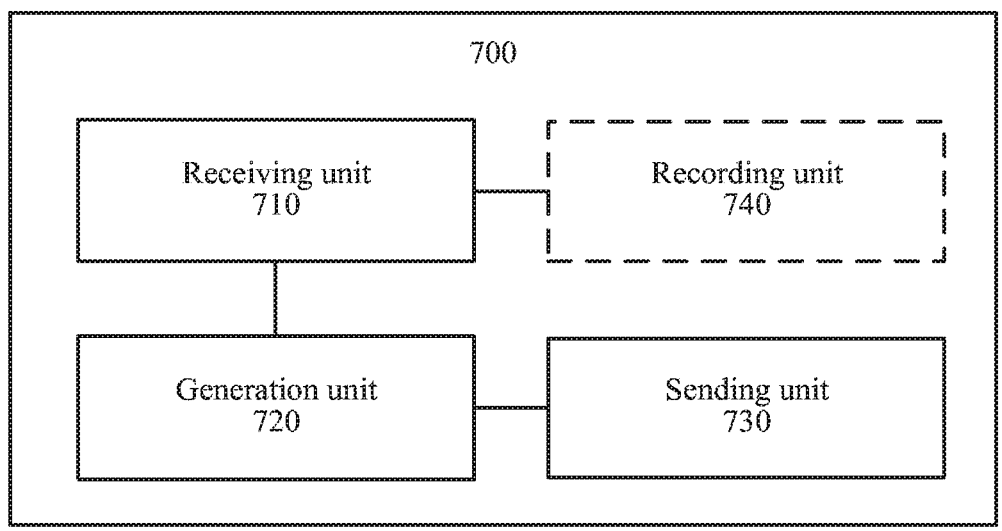
FIG. 7 is a schematic structural diagram of a network device according to another embodiment.

FIG. 7 is a schematic structural diagram of a network device according to an embodiment. The network device 700 includes: a receiving unit 710, a generation unit 720, and a sending unit 730. The receiving unit 710 is configured to receive a first packet sent by an optical module, where a communication path exists between the network device and a network management system, the first packet is generated by the optical module according to a service packet that passes through the optical module, a source address of the first packet is the same as a source address of the service packet, a destination address of the first packet is the same as a destination address of the service packet, and the first packet includes an identifier of the optical module and feature information, where the feature information is used to indicate that a packet including the feature information is an optical module management packet, and the first packet is used to snoop whether a first transmission path from the optical module to the network device exists; the generation unit 720 is configured to generate a second packet according to the first packet, where a destination address of the second packet is the same as the source address of the first packet, the second packet is used to respond to the first packet, the second packet is used to indicate that the first transmission path from the optical module to the network device exists, and instruct the optical module to communicate with the network management system by using the network device and the first transmission path, and the second packet includes the identifier of the optical module and the feature information; and the sending unit 730 is configured to send the second packet to the optical module.

According to this embodiment, a network device may generate a second packet according to a first packet sent by an optical module, and return the second packet to the optical module, so that the optical module determines a transmission path between the optical module and the network device according to the second packet returned by the network device. Because there is a communication path between the network device and a network management system, the optical module may communicate with the network management system by using the network device without requiring a host device to provide a data reporting service to the optical module. Therefore, in a case in which the host device of the optical module is not reconstructed, the optical module can send data to the network management system, thereby reducing reconstruction costs of a network and impact on the original network.

Optionally, as another embodiment, the sending unit 730 is further configured to: after the receiving unit 710 receives the first packet sent by the optical module, send a fifth packet to the network management system, where the fifth packet includes the identifier of the optical module and an identifier of the network device, and the fifth packet is used to notify the network management system of the identifier of the optical module and the identifier of the network device.

Optionally, as another embodiment, the receiving unit 710 is further configured to receive a third packet sent by the optical module, where the third packet includes the identifier of the optical module and the feature information, and the third packet is used to notify the network device that a second transmission path from the network device to the optical module exists.

Optionally, as another embodiment, the sending unit 730 is further configured to: after the receiving unit 710 receives the third packet sent by the optical module, send a fifth packet to the network management system, where the fifth packet includes the identifier of the optical module and an identifier of the network device, and the fifth packet is used to notify the network management system of the identifier of the optical module and the identifier of the network device.

Optionally, as another embodiment, the network device 700 further includes a recording unit 740, configured to: after the receiving unit 710 receives the third packet sent by the optical module, record, in a path table of the network device, information about the second transmission path, where the information about the second transmission path includes a mapping relationship among an egress interface, the destination address of the second packet, and the identifier of the optical module, and the egress interface is an interface for the network device to send the second packet.

Optionally, as another embodiment, the sending unit 730 is further configured to: if the network device receives a maintenance message sent by the optical module, send a maintenance reply message according to the maintenance message, where the maintenance message is used to determine whether the first transmission path between the optical module and the network device is available, and the maintenance reply message is used to respond to the maintenance message.

Optionally, as another embodiment, the sending unit 730 is further configured to send a sixth packet to the optical module through the egress interface, where the sixth packet is used to configure the optical module or request measurement data, and the sixth packet includes the feature information.

Optionally, the first packet includes an IP packet header, a Protocol field in the IP packet header identifies that the IP packet header is used to encapsulate an ICMP packet, a type field of the ICMP packet is set to an echo reply, and the ICMP packet includes the feature information.

The network device 700 may perform the corresponding steps in the methods in the embodiments corresponding to FIG. 3, FIG. 4A, and FIG. 5. To avoid repetition, details are not provided again herein.

Figure 8:
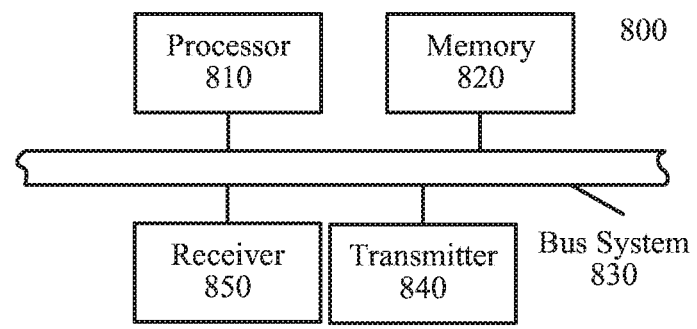
FIG. 8 is a schematic structural diagram of an optical module according to another embodiment.

FIG. 8 is a schematic structural diagram of an optical module according to an embodiment. The optical module 800 includes a processor 810, a memory 820, a bus system 830, a transmitter 840, and a receiver 850.

The processor 810, the memory 820, and the transmitter 840 are connected by using the bus system 830, where the memory 820 is configured to store an instruction, and the processor Bio is configured to execute the instruction stored in the memory 820. The processor 810 is configured to invoke, by using the bus system 830, the instruction stored in the memory 820, where the instruction is used to generate a first packet according to a service packet that passes through the optical module, where a source address of the first packet is the same as a source address of the service packet, a destination address of the first packet is the same as a destination address of the service packet, the first packet further includes an identifier of the optical module and feature information, where the feature information is used to indicate that a packet including the feature information is an optical module management packet, and the first packet is used to snoop whether a first transmission path from the optical module to a network device exists. The transmitter 840 is configured to send the first packet in a transmission direction of the service packet. The receiver 850 is configured to receive a second packet sent by the network device, where the second packet is used to respond to the first packet, and the second packet is used to indicate that the first transmission path from the optical module to the network device exists, and instruct the optical module to communicate with a network management system by using the network device and the first transmission path, where a communication path exists between the network device and the network management system, the second packet includes the identifier of the optical module and the feature information, and a destination address of the second packet is the same as the source address of the first packet.

According to the technical solution of this embodiment, a packet is generated according to a service packet that passes through an optical module, the packet is sent in a transmission direction of the service packet, and a transmission path between the optical module and a network device is determined according to a packet returned by the network device. Because there is a communication path between the network device and a network management system, the optical module may communicate with the network management system by using the network device without requiring a host device to provide a data reporting service to the optical module. Therefore, in a case in which the host device of the optical module is not reconstructed, the optical module can send data to the network management system, thereby reducing reconstruction costs of a network and impact on the original network.

Optionally, as another embodiment, the processor 810 executes the instruction, and is further configured to generate a third packet according to the second packet, where the third packet includes the identifier of the optical module and the feature information, and the third packet is used to notify the network device that a second transmission path from the network device to the optical module exists; and the transmitter 840 is further configured to send the third packet through the first transmission path.

Optionally, as another embodiment, a source address carried in the second packet is the destination address of the first packet, and the processor Bio executes the instruction, and is further configured to: after the receiver 850 receives the second packet sent by the network device, record, in a path table of the optical module, information about the first transmission path, where the information about the first transmission path includes the destination address of the first packet.

Optionally, as another embodiment, a source address carried in the second packet is an address of the network device, and the processor 810 executes the instruction, and is further configured to: after the receiver 850 receives the second packet sent by the network device, record, in a path table of the optical module, information about the first transmission path, where the information about the first transmission path includes the address of the network device.

Optionally, as another embodiment, the transmitter 840 is further configured to: after the information about the first transmission path is recorded in the path table of the optical module, send a maintenance message to the network device, where the maintenance message is used to determine whether the first transmission path is available, and the processor Bio executes the instruction, and is further configured to: if the receiver 850 receives, within a preset period of time, a maintenance reply message sent by the network device, determine that the first transmission path is available; or if the receiver 850 does not receive, within a preset period of time, a maintenance reply message sent by the network device, delete the information about the first transmission path from the path table of the optical module, where the maintenance reply message is used to respond to the maintenance message.

Optionally, as another embodiment, the processor Bio executes the instruction, and is further configured to: after the receiver 850 receives the second packet sent by the network device, generate a fourth packet according to the information about the first transmission path, and the transmitter 840 is further configured to send the fourth packet, where the fourth packet is used to report measurement data to the network management system, and the fourth packet includes the feature information.

Optionally, the first packet includes an IP packet header, a Protocol field in the IP packet header identifies that the IP packet header is used to encapsulate an ICMP packet, a type field of the ICMP packet is set to an echo reply, and the ICMP packet includes the feature information.

The optical module 800 may perform the corresponding steps in the methods in the embodiments corresponding to FIG. 2, FIG. 4A, and FIG. 5. To avoid repetition, details are not provided again herein.

Figure 9:
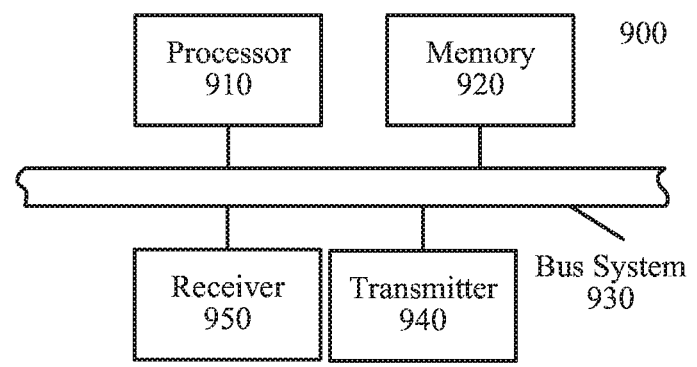
FIG. 9 is a schematic structural diagram of a network device according to another embodiment.

FIG. 9 is a schematic structural diagram of a network device according to an embodiment. A network device 900 includes a processor 910, a memory 920, a bus system 930, a transmitter 940, and a receiver 950. The processor 910, the memory 920, and the transmitter 940 are connected by using the bus system, where the memory 920 is configured to store an instruction, and the processor 910 is configured to execute the instruction stored in the memory 920. The receiver 950 is configured to receive a first packet sent by an optical module, where a communication path exists between the network device and a network management system, the first packet is generated by the optical module according to a service packet that passes through the optical module, a source address of the first packet is the same as a source address of the service packet, a destination address of the first packet is the same as a destination address of the service packet, and the first packet includes an identifier of the optical module and feature information, where the feature information is used to indicate that a packet including the feature information is an optical module management packet, and the first packet is used to snoop whether a first transmission path from the optical module to the network device exists; the processor 910 executes the instruction, and is configured to generate a second packet according to the first packet, where a destination address of the second packet is the same as the source address of the first packet, the second packet is used to respond to the first packet, the second packet is used to indicate that the first transmission path from the optical module to the network device exists, and instruct the optical module to communicate with the network management system by using the network device and the first transmission path, and the second packet includes the identifier of the optical module and the feature information; and the transmitter 940 is configured to send the second packet to the optical module.

According to this embodiment, a network device may generate a second packet according to a first packet sent by an optical module, and return the second packet to the optical module, so that the optical module determines a transmission path between the optical module and the network device according to the second packet returned by the network device. Because there is a communication path between the network device and a network management system, the optical module may communicate with the network management system by using the network device without requiring a host device to provide a data reporting service to the optical module. Therefore, in a case in which the host device of the optical module is not reconstructed, the optical module can send data to the network management system, thereby reducing reconstruction costs of a network and impact on the original network.

Optionally, as another embodiment, the transmitter 940 is further configured to: after the receiver 950 receives the first packet sent by the optical module, send a fifth packet to the network management system, where the fifth packet includes the identifier of the optical module and an identifier of the network device, and the fifth packet is used to notify the network management system of the identifier of the optical module and the identifier of the network device.

Optionally, as another embodiment, the receiver 950 is further configured to receive a third packet sent by the optical module, where the third packet includes the identifier of the optical module and the feature information, and the third packet is used to notify the network device that a second transmission path from the network device to the optical module exists.

Optionally, as another embodiment, the transmitter 940 is further configured to: after the receiver 950 receives the third packet sent by the optical module, send a fifth packet to the network management system, where the fifth packet includes the identifier of the optical module and an identifier of the network device, and the fifth packet is used to notify the network management system of the identifier of the optical module and the identifier of the network device.

Optionally, as another embodiment, the processor 910 executes the instruction, and is further configured to: after the receiver 950 receives the third packet sent by the optical module, record, in a path table of the network device, information about the second transmission path, where the information about the second transmission path includes a mapping relationship among an egress interface, the destination address of the second packet, and the identifier of the optical module, and the egress interface is an interface for the network device to send the second packet.

Optionally, as another embodiment, the transmitter 940 is further configured to: if the receiver 950 receives a maintenance message sent by the optical module, send a maintenance reply message according to the maintenance message, where the maintenance message is used to determine whether the first transmission path between the optical module and the network device is available, and the maintenance reply message is used to respond to the maintenance message.

Optionally, as another embodiment, the transmitter 940 is further configured to send a sixth packet to the optical module through the egress interface, where the sixth packet is used to configure the optical module or request measurement data, and the sixth packet includes the feature information.

Optionally, the first packet includes an IP packet header, a protocol field in the IP packet header identifies that the IP packet header is used to encapsulate an ICMP packet, a type field of the ICMP packet is set to an echo reply, and the ICMP packet includes the feature information.

The network device 900 may perform the corresponding steps in the methods in the embodiments corresponding to FIG. 3, FIG. 4A, and FIG. 5. To avoid repetition, details are not provided again herein.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions, but is not intended to limit the protection scope of this application. Any modification, equivalent replacement, or improvement made without departing from the principle of this application shall fall within the protection scope of this application.

What is claimed is:

1. A method comprising:
   generating, by an optical module, a first packet according to a service packet that passes through the optical module, wherein a source address of the first packet is the same as a source address of the service packet, wherein a destination address of the first packet is the same as a destination address of the service packet, wherein the first packet further comprises an identifier of the optical module and feature information, wherein the feature information indicate that the first packet comprising the feature information is an optical module management packet, and wherein the first packet is configured to snoop whether a first transmission path from the optical module to a network device exists;

sending, by the optical module, the first packet in a transmission direction of the service packet to the network device; and receiving, by the optical module, a second packet sent by the network device, wherein the second packet responds to the first packet, wherein the second packet indicates that the first transmission path from the optical module to the network device exists, wherein the second packet instructs the optical module to communicate with a network management system by using the network device and the first transmission path, wherein a communication path exists between the network device and the network management system, wherein the second packet comprises the identifier of the optical module and the feature information, and wherein a destination address of the second packet is the same as the source address of the first packet.

2. The method according to claim 1, further comprising:
generating, by the optical module, a third packet according to the second packet, wherein the third packet comprises the identifier of the optical module and the feature information, and the third packet notifies the network device that a second transmission path from the network device to the optical module exists; and
sending, by the optical module, the third packet through the first transmission path.

3. The method according to claim 1, further comprising, after receiving the second packet sent by the network device, recording, by the optical module, information about the first transmission path in a path table of the optical module, wherein the information about the first transmission path comprises the destination address of the first packet, and wherein a source address allocated in the second packet is the destination address of the first packet.

4. The method according to claim 1, further comprising, after receiving the second packet sent by the network device, recording, by the optical module, information about the first transmission path in a path table of the optical module, wherein the information about the first transmission path comprises the address of the network device, and wherein a source address carried in the second packet is an address of the network device.

5. The method according to claim 3, further comprising:
after recording the information about the first transmission path in a path table of the optical module, sending, by the optical module, a maintenance message to the network device, wherein the maintenance message is used to determine whether the first transmission path is available; and
determining that the first transmission path is available if the optical module receives, within a preset period of time, a maintenance reply message sent by the network device, wherein the maintenance reply message responds to the maintenance message; or
deleting the information about the first transmission path from the path table of the optical module if the optical module does not receive, within a preset period of time, a maintenance reply message sent by the network device.

6. The method according to claim 3, further comprising, after receiving the second packet sent by the network device, generating and sending, by the optical module, a fourth packet according to the information about the first transmission path, wherein the fourth packet reports measurement data to the network management system, and wherein the fourth packet comprises the feature information.

7. A method comprising:
receiving, by a network device, a first packet sent by an optical module, wherein a communication path exists between the network device and a network management system, wherein the first packet is generated by the optical module according to a service packet that passes through the optical module, wherein a source address of the first packet is the same as a source address of the service packet, wherein a destination address of the first packet is the same as a destination address of the service packet, wherein the first packet comprises an identifier of the optical module and feature information, wherein the feature information indicates that the first packet comprising the feature information is an optical module management packet, and wherein the first packet is configured to snoop whether a first transmission path from the optical module to the network device exists;
generating, by the network device, a second packet according to the first packet, wherein a destination address of the second packet is the same as the source address of the first packet, wherein the second packet responds to the first packet, wherein the second packet indicates that the first transmission path from the optical module to the network device exists, wherein the second packet instructs the optical module to communicate with the network management system by using the network device and the first transmission path, and wherein the second packet comprises the identifier of the optical module and the feature information; and
sending, by the network device, the second packet to the optical module.

8. The method according to claim 7, further comprising sending, by the network device, a fifth packet to the network management system after receiving the first packet sent by the optical module, wherein the fifth packet comprises the identifier of the optical module and an identifier of the network device, and wherein the fifth packet is used to notify the network management system of the identifier of the optical module and the identifier of the network device.

9. The method according to claim 7, further comprising receiving, by the network device, a third packet sent by the optical module, wherein the third packet comprises the identifier of the optical module and the feature information, and wherein the third packet notifies the network device that a second transmission path from the network device to the optical module exists.

10. The method according to claim 9, further comprising sending, by the network device, a fifth packet to the network management system after receiving the third packet sent by the optical module, wherein the fifth packet comprises the identifier of the optical module and an identifier of the network device, and wherein the fifth packet notifies the network management system of the identifier of the optical module and the identifier of the network device.

11. The method according to claim 9, further comprising recording, by the network device, information about the second transmission path in a path table of the network device after receiving the third packet sent by the optical module, wherein the information about the second transmission path comprises a mapping relationship among an egress interface, the destination address of the second packet, and the identifier of the optical module, and wherein the egress interface is an interface for the network device to send the second packet.

12. An optical module comprising:
a processor; and
a non-transitory computer-readable storage medium coupled to the processor and storing programming instructions for execution by the processor, the programming instructions instruct the processor to:
generate a first packet according to a service packet that passes through the optical module, wherein a source address of the first packet is the same as a source address of the service packet, a destination address of the first packet is the same as a destination address of the service packet, wherein the first packet further comprises an identifier of the optical module and feature information, wherein the feature information indicates that the first packet comprising the feature information is an optical module management packet, and wherein the first packet is configured to snoop whether a first transmission path from the optical module to a network device exists;
send the first packet in a transmission direction of the service packet to the network device; and
receive a second packet sent by the network device, wherein the second packet responds to the first packet, wherein the second packet indicates that the first transmission path from the optical module to the network device exists, wherein the second packet instructs the optical module to communicate with a network management system using the network device and the first transmission path, wherein a communication path exists between the network device and the network management system, wherein the second packet comprises the identifier of the optical module and the feature information, and wherein a destination address of the second packet is the same as the source address of the first packet.

13. The optical module according to claim 12, wherein the programming instructions further instruct the processor to:
generate a third packet according to the second packet, wherein the third packet comprises the identifier of the optical module and the feature information, wherein the third packet notifies the network device that a second transmission path from the network device to the optical module exists; and
send the third packet through the first transmission path.

14. The optical module according to claim 12, wherein a source address assigned to the second packet is the destination address of the first packet, wherein the programming instructions further instruct the processor to record information about the first transmission path in a path table of the optical module after receiving the second packet sent by the network device, and wherein the information about the first transmission path comprises the destination address of the first packet.

15. A network device comprising:
a processor; and
a non-transitory computer-readable storage medium coupled to the processor and storing programming instructions for execution by the processor, the programming instructions instruct the processor to:
receive a first packet sent by an optical module, wherein a communication path exists between the network device and a network management system, wherein the first packet is generated by the optical module according to a service packet that passes through the optical module, wherein a source address of the first packet is the same as a source address of the service packet, wherein a destination address of the first packet is the same as a destination address of the service packet, wherein the first packet comprises an identifier of the optical module and feature information, wherein the feature information indicates that the first packet comprising the feature information is an optical module management packet, and wherein the first packet is configured to snoop whether a first transmission path from the optical module to the network device exists;
generate a second packet according to the first packet, wherein a destination address of the second packet is the same as the source address of the first packet, wherein the second packet responds to the first packet and indicates that the first transmission path from the optical module to the network device exists, wherein the second packet instructs the optical module to communicate with the network management system by using the network device and the first transmission path, and wherein the second packet comprises the identifier of the optical module and the feature information; and
send the second packet to the optical module.

16. The network device according to claim 15, wherein the programming instructions further instruct the processor to send a fifth packet to the network management system after receiving the first packet sent by the optical module, wherein the fifth packet comprises the identifier of the optical module and an identifier of the network device, and wherein the fifth packet notifies the network management system of the identifier of the optical module and the identifier of the network device.

17. The network device according to claim 15, wherein the programming instructions further instruct the processor to receive a third packet sent by the optical module, wherein the third packet comprises the identifier of the optical module and the feature information, and wherein the third packet notifies the network device that a second transmission path from the network device to the optical module exists.

18. The network device according to claim 17, wherein the programming instructions further instruct the processor to send a fifth packet to the network management system after receiving the third packet sent by the optical module, wherein the fifth packet comprises the identifier of the optical module and an identifier of the network device, and wherein the fifth packet notifies the network management system of the identifier of the optical module and the identifier of the network device.

19. The network device according to claim 17, wherein the programming instructions further instruct the processor to record in a path table of the network device information about the second transmission path after receiving the third packet sent by the optical module, wherein the information about the second transmission path comprises a mapping relationship among an egress interface, the destination address of the second packet, and the identifier of the optical module, and wherein the egress interface is an interface for the network device to send the second packet.

20. The network device according to claim 19, wherein the programming instructions further instruct the processor to a maintenance reply message according to the maintenance message if the network device receives a maintenance message sent by the optical module, wherein the maintenance message determines whether the first transmission path between the optical module and the network device is available, and wherein the maintenance reply message is used to respond to the maintenance message.

* * * * *

UNITED STATES PATENT AND TRADEMARK OFFICE
CERTIFICATE OF CORRECTION

PATENT NO. : 10,075,395 B2
APPLICATION NO. : 15/232480
DATED : September 11, 2018
INVENTOR(S) : Hongming Liu It is certified that error appears in the above-identified patent and that said Letters Patent is hereby corrected as shown below:

In Column 38, Lines 64-65, Claim 20, delete "instruct the processor to a maintenance reply message" and insert --instruct the processor to send a maintenance reply message--.

Signed and Sealed this
Sixth Day of November, 2018

Andrei Iancu
*Director of the United States Patent and Trademark Office*